(12) United States Patent
Sagimori et al.

(10) Patent No.: US 10,477,068 B2
(45) Date of Patent: Nov. 12, 2019

(54) IMAGE PROCESSING APPARATUS FOR PRIMARY COLOR AND SPOT HALFTONING

(71) Applicants: Yuuki Sagimori, Kanagawa (JP); Akiho Watanabe, Kanagawa (JP)

(72) Inventors: Yuuki Sagimori, Kanagawa (JP); Akiho Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 97 days.

(21) Appl. No.: 15/460,544

(22) Filed: Mar. 16, 2017

(65) Prior Publication Data

US 2017/0272611 A1  Sep. 21, 2017

(30) Foreign Application Priority Data

Mar. 18, 2016  (JP) .................................. 2016-055748
Jan. 11, 2017  (JP) .................................. 2017-002759

(51) Int. Cl.
*H04N 1/405* (2006.01)
*H04N 1/52* (2006.01)
*H04N 1/60* (2006.01)

(52) U.S. Cl.
CPC ............ *H04N 1/4058* (2013.01); *H04N 1/52* (2013.01); *H04N 1/6008* (2013.01); *H04N 1/6027* (2013.01)

(58) Field of Classification Search
None
See application file for complete search history.

(56) References Cited

U.S. PATENT DOCUMENTS

| 5,594,839 A | 1/1997 | Shu | |
| 6,608,641 B1* | 8/2003 | Alexandrovich | G03G 15/0105 347/131 |
| 6,791,715 B1* | 9/2004 | Fujita | H04N 1/4058 358/1.9 |
| 7,277,201 B2* | 10/2007 | Hains | H04N 1/4058 358/1.9 |
| 2004/0239967 A1* | 12/2004 | Wen | H04N 1/52 358/1.9 |
| 2005/0243340 A1* | 11/2005 | Tai | H04N 1/52 358/1.9 |
| 2010/0027035 A1* | 2/2010 | Stelter | G03G 15/0126 358/1.9 |

(Continued)

FOREIGN PATENT DOCUMENTS

| JP | 08-237496 | 9/1996 |
| JP | 2013-218174 | 10/2013 |

*Primary Examiner* — Jason A Pringle-Parker
(74) *Attorney, Agent, or Firm* — Oblon, McClelland, Maier & Neustadt, L.L.P.

(57) ABSTRACT

An image processing apparatus includes processing circuitry. The processing circuitry is to acquire image data including primary color image data for primary color and spot color image data for spot color; generate primary color halftone data representing the primary color image data as a group of halftone dots, using a primary color screen specifying cyclic arrangement of lines of halftone dots; and generate spot color halftone data representing the spot color image data as a group of halftone dots, using a spot color screen having a second phase that is different from a first phase represented by the cyclic arrangement of lines specified in the primary color screen.

9 Claims, 15 Drawing Sheets

(56) References Cited

U.S. PATENT DOCUMENTS

2013/0265608 A1 10/2013 Yoshida et al.
2014/0009770 A1* 1/2014 Chen .................... H04N 1/4058
                                                          358/1.9
2014/0226187 A1 8/2014 Sagimori

* cited by examiner

FIG.4A 26A (26)

| TYPE INFORMATION | SCREEN ID | HALFTONING TYPE |
|---|---|---|
| 200Dot | ScreenID 1 | 200lpi-Dot |
| 175Dot | ScreenID 2 | 175lpi-Dot |
| 150Dot | ScreenID 3 | 150lpi-Dot |
| 360Dot | ScreenID 4 | 360lpi-Dot |
| ERROR DIFFUSION | ScreenID 5 | ERROR DIFFUSION |

FIG.4B 26B (26)

| SCREEN ID | PRIMARY COLOR INFORMATION | | | | | | | | SPOT COLOR INFORMATION | |
|---|---|---|---|---|---|---|---|---|---|---|
| | K | | C | | M | | Y | | | |
| | SCREEN FREQUENCY | ANGLE | SCREEN FREQUENCY | ANGLE | SCREEN FREQUENCY | ANGLE | SCREEN FREQUENCY | ANGLE | SCREEN FREQUENCY | ANGLE |
| ScreenID 1 | 212 | 45 | 190 | 18 | 190 | 72 | 200 | 90 | 200 | 90 |
| ScreenID 2 | 179 | 46 | 168 | 63 | 168 | 27 | 171 | 90 | 171 | 90 |
| ScreenID 3 | 154 | 45 | 145 | -75 | 145 | 75 | 150 | 90 | 150 | 90 |
| ScreenID 4 | 358 | 63 | 358 | 27 | 358 | -27 | 358 | -63 | 358 | -63 |
| ScreenID 5 | - | - | - | - | - | - | - | - | - | - |

| TYPE INFORMATION |
|---|
| 200Dot |
| 175Dot |
| 150Dot |
| 360Dot |
| ERROR DIFFUSION |

FIG.13A 27A (27)

| TYPE INFORMATION | SCREEN ID | HALFTONING TYPE |
|---|---|---|
| 200Dot | ScreenID 1 | 200lpi-Dot |
| 175Dot | ScreenID 2 | 175lpi-Dot |
| 150Dot | ScreenID 3 | 150lpi-Dot |
| 360Dot | ScreenID 4 | 360lpi-Dot |
| ERROR DIFFUSION | ScreenID 5 | ERROR DIFFUSION |
| USER DESIGNATION | ScreenID 6 | - |

FIG.13B 27B (27)

| SCREEN ID | PRIMARY COLOR INFORMATION ||||||||| SPOT COLOR INFORMATION ||
| | K || C || M || Y || ||
| | SCREEN FRE-QUENCY | AN-GLE | SCREEN FRE-QUENCY | AN-GLE | SCREEN FRE-QUENCY | AN-GLE | SCREEN FRE-QUENCY | AN-GLE | SCREEN FRE-QUENCY | AN-GLE |
|---|---|---|---|---|---|---|---|---|---|---|
| ScreenID 1 | 212 | 45 | 190 | 18 | 190 | 72 | 200 | 90 | 200 | 90 |
| ScreenID 2 | 179 | 46 | 168 | 63 | 168 | 27 | 171 | 90 | 171 | 90 |
| ScreenID 3 | 154 | 45 | 145 | -75 | 145 | 75 | 150 | 90 | 150 | 90 |
| ScreenID 4 | 358 | 63 | 358 | 27 | 358 | -27 | 358 | -63 | 358 | -63 |
| ScreenID 5 | - | - | - | - | - | - | - | - | - | - |
| ScreenID 6 | | | | | | | | | | |

FIG.16

| USER CUSTOM-IZATION | K | | C | | M | | Y | | SPOT COLOR INFORMATION | |
|---|---|---|---|---|---|---|---|---|---|---|
| | SCREEN FRE-QUENCY | AN-GLE | SCREEN FRE-QUENCY | AN-GLE | SCREEN FRE-QUENCY | AN-GLE | SCREEN FRE-QUENCY | AN-GLE | SCREEN FRE-QUENCY | AN-GLE |
| | 212 | 45 | 190 | 18 | 190 | 72 | 200 | 90 | 210 | 40 |

FIG.17

| USER CUSTOM-IZATION | K | | C | | M | | Y | | SPOT COLOR INFORMATION | | |
|---|---|---|---|---|---|---|---|---|---|---|---|
| | SCREEN FRE-QUENCY | AN-GLE | SCREEN FRE-QUENCY | AN-GLE | SCREEN FRE-QUENCY | AN-GLE | SCREEN FRE-QUENCY | AN-GLE | SCREEN FRE-QUENCY | AN-GLE | PHASE (X, Y) |
| | 212 | 45 | 190 | 18 | 190 | 72 | 200 | 90 | 210 | 40 | 0.5, 0.3 |

FIG.19

| TYPE INFORMA-TION | PRIMARY COLOR SCREEN | | | | SPOT COLOR SCREEN |
|---|---|---|---|---|---|
| | COLOR SCREEN C | COLOR SCREEN M | COLOR SCREEN Y | COLOR SCREEN K | |
| 200Dot | COLOR SCREEN 50C1 | COLOR SCREEN 50M1 | COLOR SCREEN 50Y1 | COLOR SCREEN 50K1 | SPOT COLOR SCREEN 52A |
| 175Dot | COLOR SCREEN 50C2 | COLOR SCREEN 50M2 | COLOR SCREEN 50Y2 | COLOR SCREEN 50K2 | SPOT COLOR SCREEN 52B |
| 150Dot | COLOR SCREEN 50C3 | COLOR SCREEN 50M3 | COLOR SCREEN 50Y3 | COLOR SCREEN 50K3 | SPOT COLOR SCREEN 52C |
| 360Dot | COLOR SCREEN 50C4 | COLOR SCREEN 50M4 | COLOR SCREEN 50Y4 | COLOR SCREEN 50K4 | SPOT COLOR SCREEN 52D |

FIG.20

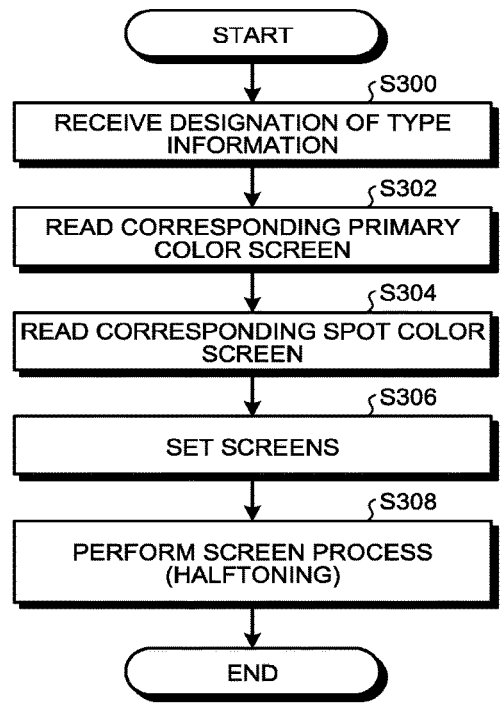

IMAGE PROCESSING APPARATUS FOR PRIMARY COLOR AND SPOT HALFTONING

CROSS-REFERENCE TO RELATED APPLICATIONS

The present application claims priority under 35 U.S.C. § 119 to Japanese Patent Application No. 2016-055748, filed on Mar. 18, 2016 and Japanese Patent Application No. 2017-002759, filed on Jan. 11, 2017. The contents of which are incorporated herein by reference in their entirety.

BACKGROUND OF THE INVENTION

1. Field of the Invention

The present invention relates to an image processing apparatus, an image processing method, and a computer-readable recording medium.

2. Description of the Related Art

Known is an apparatus for forming images using not only primary color materials, such as those for CMYK colors, but also spot color materials. Such a spot color material can also provide a spot color effect, such as gloss, as disclosed in, for example, Japanese Unexamined Patent Application Publication No. 8-237496.

Another conventional technology is known that performs gradation processing (screening) using screens at different screen angles when an image is formed using primary color materials.

However, conventional overlapping of primary color materials with a spot color material often results in undesired color.

SUMMARY OF THE INVENTION

According to one aspect of the present invention, an image processing apparatus includes processing circuitry. The processing circuitry is to acquire image data including primary color image data for primary color and spot color image data for spot color; generate primary color halftone data representing the primary color image data as a group of halftone dots, using a primary color screen specifying cyclic arrangement of lines of halftone dots; and generate spot color halftone data representing the spot color image data as a group of halftone dots, using a spot color screen having a second phase that is different from a first phase represented by the cyclic arrangement of lines specified in the primary color screen.

BRIEF DESCRIPTION OF THE DRAWINGS

FIGS. 4A and 4B are schematics illustrating an example of a data structure of first information;

FIG. 5 is a schematic illustrating an example of a display window;

FIGS. 13A and 13B are schematics illustrating an example of a data structure of the first information;

FIG. 16 is a schematic illustrating an example of a display window;

FIG. 17 is a schematic illustrating an example of a display window;

FIG. 19 is a schematic illustrating an example of a data structure of the first information; and FIG. 20 is a flowchart illustrating an example of the sequence of image processing executed by the image processing apparatus.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
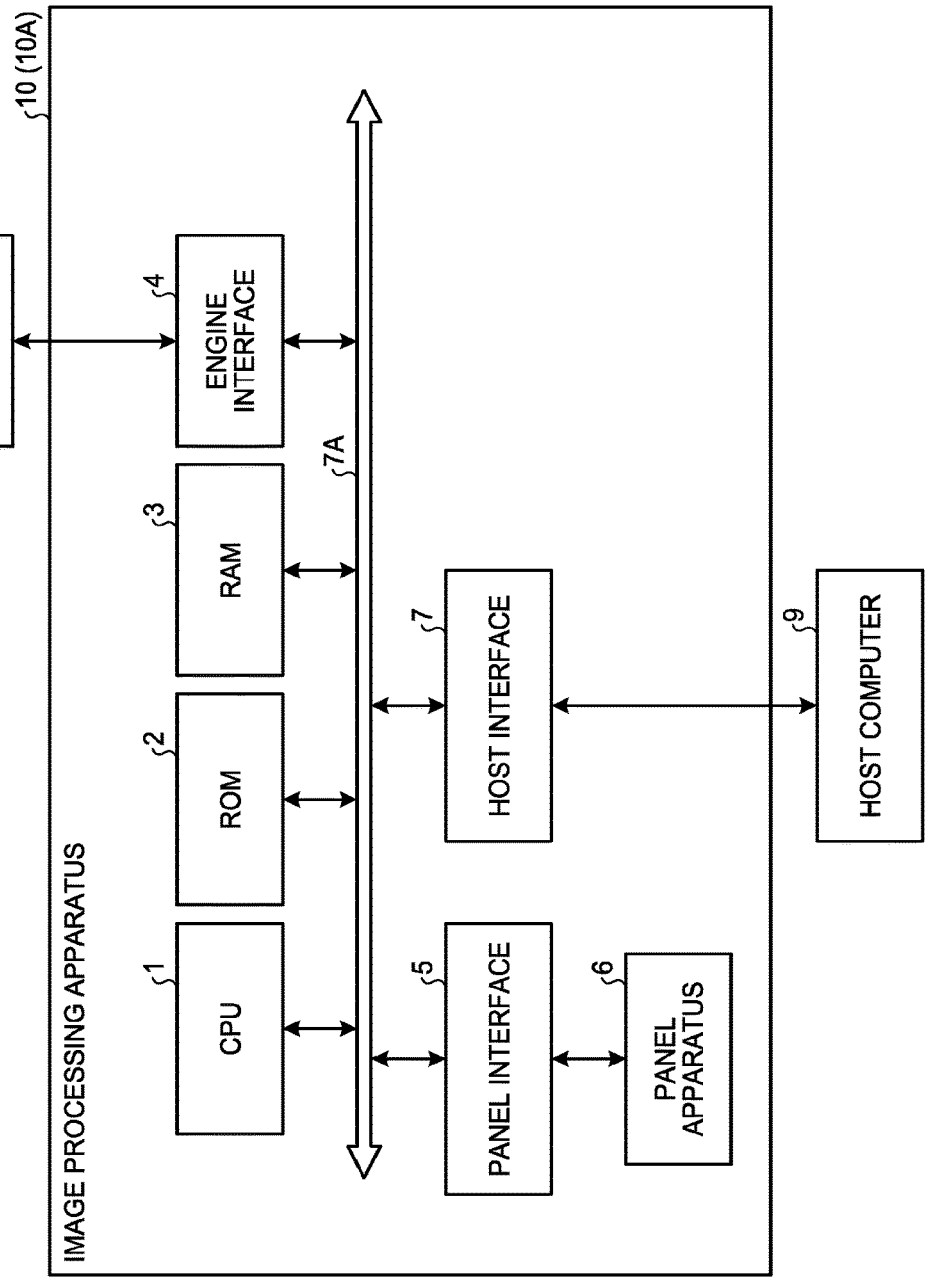
FIG. 1 is a schematic illustrating an example of a hardware configuration of an image processing apparatus according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

First Embodiment

FIG. 1 illustrates an example of a hardware configuration of an image processing apparatus 10 according to a first embodiment of the present invention.

The image processing apparatus 10 is an apparatus that performs image processing according to the embodiment. To the image processing apparatus 10, a host computer 9 is connected. An example of the host computer 9 includes a personal computer (PC). The image processing apparatus 10 receives image data from the host computer 9. The image processing apparatus 10 then performs the image processing to the image data.

Figure 2:
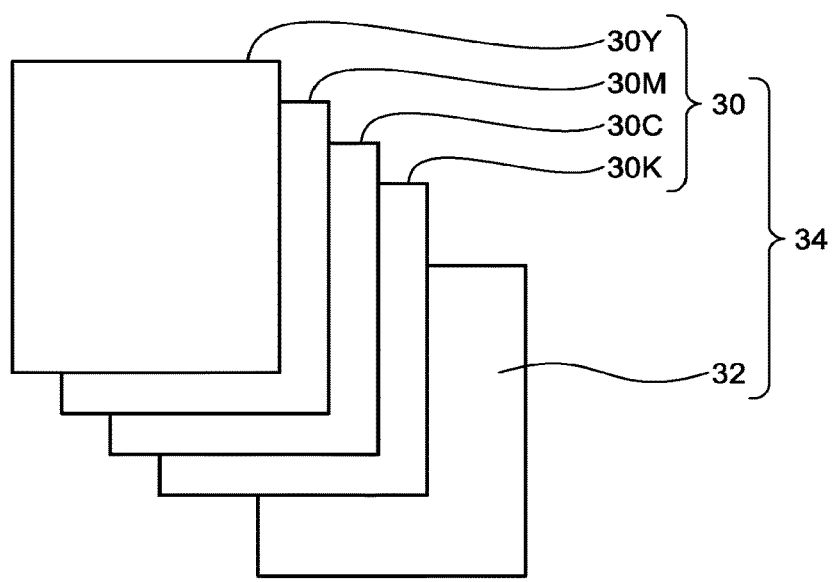
FIG. 2 is a conceptual schematic illustrating image data.

FIG. 2 is a conceptual schematic of image data 34. The image data 34 includes primary color image data 30, and spot color image data 32. The image data 34 may also include a job command indicating conditions for causing an engine unit 8 to form an image.

The primary color image data 30 is image data in which the density of primary colors such as RGB or CMYK color is defined. In the embodiment, the primary color image data 30 includes a plurality of pieces of color image data having colors that are different from one another. Explained in the embodiment is an example in which the primary color image data 30 includes pieces of color image data of yellow, magenta, cyan, and black (pieces of color image data 30Y, 30M, 30C, and 30K).

Explained in the embodiment is an example in which the primary color image data 30 is image data in which the density of the corresponding primary color in units of one pixel is defined. Therefore, in the embodiment, each piece of color image data included in the primary color image data 30 (color image data 30Y, 30M, 30C, and 30K) is a piece of image data defining a density of the corresponding color (C, M, Y, K) in units of one pixel. Furthermore, explained in this embodiment is an example in which the primary color image data 30 is data using eight bits to represent a density at one pixel.

The image processing apparatus 10 may receive image data 34 including R, G, and B color image data from the host computer 9. In such a case, the image processing apparatus 10 may convert the R, G, and B color image data into pieces of C, M, Y, K color image data (30Y, 30M, 30C, and 30K).

The spot color image data 32 is image data in which the density of a spot color for each pixel is defined. A spot color is color other than the primary colors such as CMYK or RGB. Examples of the spot color include metallic color using metal, white color, or transparent color. A metallic color is a color reproducing metallic gloss. Examples of the metallic color include gold color and silver color. The metallic color may be another color resultant of adding color such as CMYK or RGB to base metallic color such as gold color or silver color.

Explained in this embodiment is an example in which the spot color image data 32 is data using eight bits to represent a density at one pixel.

Referring back to FIG. 1, the explanation is continued. The image processing apparatus 10 performs image processing to the image data 34 received from the host computer 9. Through this image processing, the image processing apparatus 10 generates print data in a format that can be processed by the engine unit 8. The engine unit 8 forms an image on a recording medium using the print data generated by the image processing apparatus 10.

The engine unit 8 is a known electrophotographic image forming apparatus. In the embodiment, mounted on the engine unit 8 are primary color toners of CMYK, and a spot color toner, serving as primary color materials and a spot color material, respectively. The spot color toner is a toner used to achieve the spot color. Examples of the spot color toner include metallic toner, transparent (no color) toner, and white color toner. Explained in the embodiment is an example in which transparent toner is used as the spot color toner.

The engine unit 8 may be an apparatus that forms images using primary color inks in CMYK and spot color ink in a spot color, serving as the primary color materials and the spot color material, respectively.

The image processing apparatus 10 includes a central processing unit (CPU) 1, a read-only memory (ROM) 2, a random access memory (RAM) 3, an engine interface 4, a panel interface 5, a panel apparatus 6, and a host interface 7. The CPU 1, the ROM 2, the RAM 3, the engine interface 4, the panel interface 5, and the host interface 7 are connected in a manner enabled to transmit and to receive data to and from each other over a bus 7A.

The panel interface 5 is an interface for connecting the panel apparatus 6. The panel apparatus 6 has an input function for receiving an operation instruction from a user, and a display function for displaying various images. The panel apparatus 6 may include the input function and the display function provided as separate devices.

An example of the input function includes a touch panel. Other examples of the input function include a keyboard and a mouse. An example of the display function includes a liquid crystal display device and a display device using organic electro luminescence (EL).

The host interface 7 is an interface for connecting the host computer 9. The engine interface 4 is an interface for connecting the engine unit 8.

Figure 3:
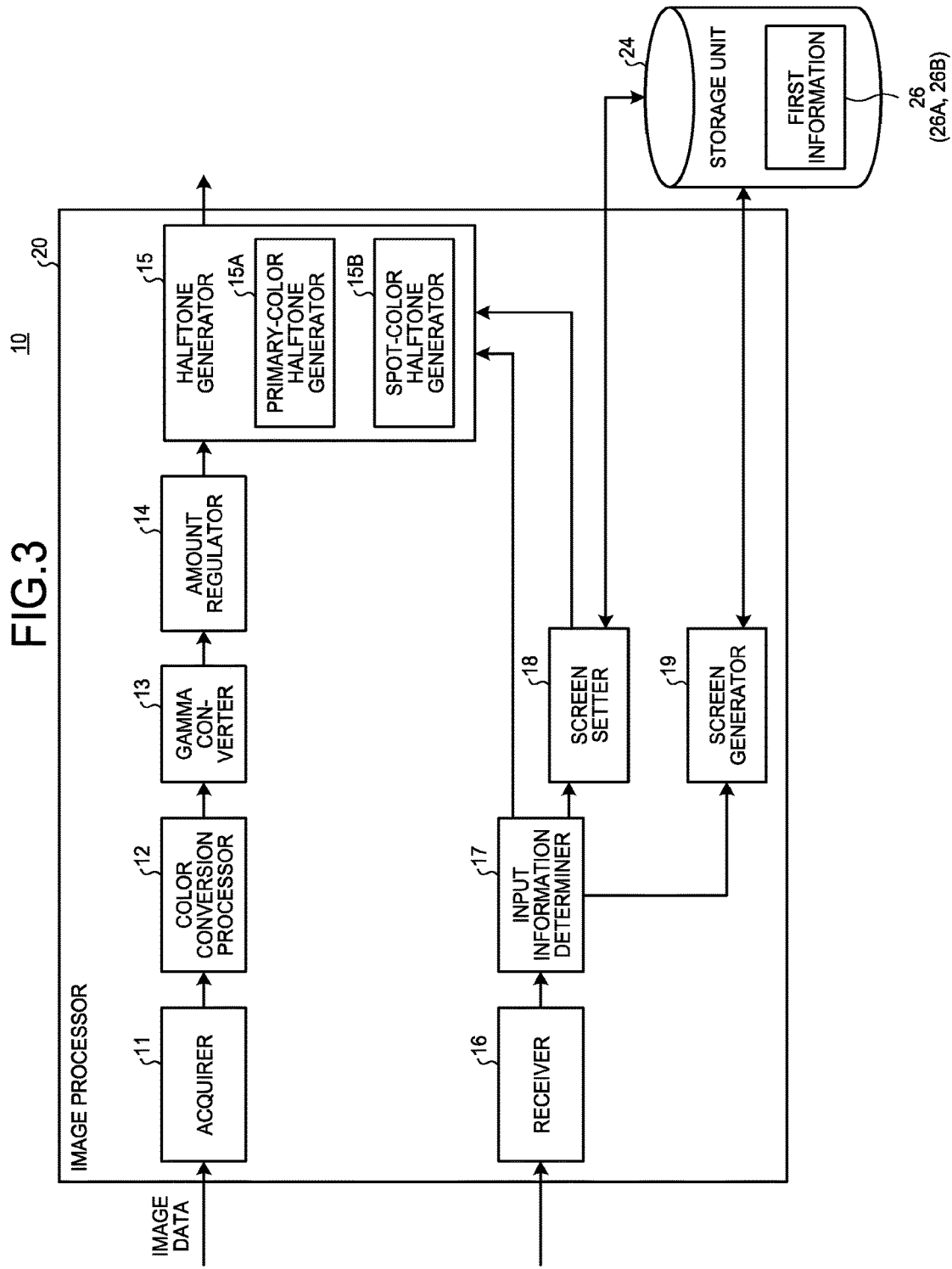
FIG. 3 is a block diagram illustrating a functional configuration of the image processing apparatus.

A functional configuration of the image processing apparatus 10 will now be explained. FIG. 3 is a block diagram illustrating a functional configuration of the image processing apparatus 10.

The image processing apparatus 10 includes an image processor 20 and a storage unit 24. The image processor 20 and the storage unit 24 are connected in a manner enabled to transmit and to receive data or a signal to and from each other.

The storage unit 24 stores therein various types of information. The storage unit 24 is implemented as a hard disk drive (HDD), for example.

In the embodiment, the storage unit 24 stores therein the first information 26. The first information 26 is information used in halftoning (details of which will be described later) performed by the image processor 20.

FIGS. 4A and 4B are schematics illustrating an example of a data structure of the first information 26. The first information 26 is information for mapping a piece of type information with screen frequencies and screen angles for respective pieces of primary color information and spot color information.

Explained in the embodiment is an example in which the first information 26 is used in a manner divided into a first table 26A and a second table 26B. The first table 26A and the second table 26B may together be provided as one table or one data base.

The first table 26A is a piece of data for mapping a piece of type information with a screen ID and a halftoning type.

FIG. 4A is a schematic illustrating an example of a data structure of the first table 26A. The first table 26A is a piece of data for mapping a piece of type information with a screen ID and a halftoning type.

The type information is a piece of information indicating the type of halftoning performed by the image processor 20. Specifically, the type information is a piece of information indicating the type of screen used in the halftoning.

FIG. 4A presents five pieces of type information (200 Dot, 175 Dot, 150 Dot, 360 Dot, error diffusion), as an example. The type information is, however, not limited to the example illustrated in FIG. 4A.

A screen ID is a piece of information for identifying a screen used in halftoning (sometimes referred to as a screening process or screening). A screen is a piece of pattern data for spuriously achieving a gradation expression of middle tones, using halftone dots. A screen is a cyclic arrangement of halftone dots representing the area to which the coloring material is to be attached and the area to which no color material is to be applied (an area other than the halftone dots). In other words, a screen is represented by cyclic lines along which halftone dot are arranged.

The halftoning type is a piece of information indicating the type of halftoning corresponding to the type information. Illustrated as an example in FIG. 4A are five types of halftoning, 200 lpi-Dot, 175 lpi-Dot, 150 lpi-Dot, 360 lpi-Dot, and error diffusion.

In FIG. 4A, in the items with "lpi-Dot", the number followed by "lpi" indicates a screen frequency, and "Dot" indicates a dot-concentrating type screen. The screen indicated by "lpi-Dot" represents a pattern change in which the halftone dots grow into a true circle as the output resolution is increased. The screen represented by "lpi-line" indicates a line screen. The screen represented by "lpi-line" represents a pattern change in which the halftone dots grow in a manner in connected a linear shape, in a direction at a certain angle, as the output resolution is increased. The error diffusion indicates the dot-diffused halftoning (screen process).

FIG. 4B is a schematic illustrating an example of a data structure of the second table 26B. The second table 26B is a piece of data for mapping a screen ID with screen frequencies and screen angles corresponding to the pieces of the primary color information and the spot color information. The "screen frequency" in FIG. 4B represents screen frequencies, and the "angle" represents screen angles.

The primary color information is a piece of information indicating a primary color. In the embodiment, the primary color information includes pieces of color information for C, M, Y, and K colors. The spot color information is a piece of information indicating a spot color.

A screen frequency represents a density of halftone dots per unit length. Specifically, the screen frequency represents the number of halftone dots arranged per one inch. The screen angle represents an angle of the lines along which the halftone dots are arranged. The direction of the arrangement lines is sometimes referred to as a screen direction. For dot-diffusing screen process such as error diffusion, the screen frequency and the screen angle are not defined.

As indicated in FIG. 4B, different values are set in advance to the second table 26B for the respective pieces of color information (C, M, Y, K) included in the primary color information, as the screen frequencies and the screen angles corresponding to the respective pieces of color information.

It is however preferable for the screen frequency and the screen angle corresponding to the spot color information to be the same as the screen frequency and the screen angle specified for one of the pieces of color information (C, M, Y, K) included in the primary color information. In the example illustrated in FIG. 4B, the screen frequency and the screen angle corresponding to the spot color information are the same as the screen frequency and the screen angle corresponding to the primary color information for the Y color, among the pieces of the primary color information.

It is more preferable for the screen frequency and the screen angle corresponding to the spot color information to be the same as the screen frequency and the screen angle of the K color (black color), among the pieces of color information (C, M, Y, K) included in the primary color information.

Referring back to FIG. 3, the explanation is continued. The image processor 20 includes an acquirer 11, a color conversion processor 12, a gamma converter 13, an amount regulator 14, a halftone generator 15, a receiver 16, an input information determiner 17, a screen setter 18, and a screen generator 19. Some or all of the acquirer 11, the color conversion processor 12, the gamma converter 13, the amount regulator 14, the halftone generator 15, the receiver 16, the input information determiner 17, the screen setter 18, and the screen generator 19 may be implemented by causing a processor, such as the CPU 1, to execute a computer program, in other words, may be implemented as a piece of software, as a piece of hardware such as an integrated circuit (IC), or as a combination of software and hardware.

The acquirer 11 acquires the image data 34 from the host computer 9. For example, the acquirer 11 acquires the image data 34 in 1200 dpi, which represents one pixel with an eight-bit density.

The color conversion processor 12 performs a color conversion process to the primary color image data 30 included in the image data 34 acquired by the acquirer 11. For example, it is assumed now that the image data 34 acquired from the host computer 9 is primary color image data 30 representing an RGB color space. In such a case, the color conversion processor 12 converts the primary color image data 30 represented in the RGB color space into another primary color image data 30 in the CMYK color space. In this manner, the color conversion processor 12 acquires the primary color image data 30 in the CMYK colors (pieces of color image data 30C, 30M, 30Y, 30K).

The color conversion processor 12 outputs the spot color image data 32 included in the image data 34 acquired by the acquirer 11 as it is to the gamma converter 13, without performing the image processing.

The gamma converter 13 performs gamma correction to the pieces of primary color image data 30 in the CMYK colors (pieces of color image data 30C, 30M, 30Y, and 30K), and the spot color image data 32.

The amount regulator 14 performs total amount control using the primary color image data 30 and the spot color image data 32 applied with the gamma correction. There is a limitation to the amount of color material (amount of toner) the engine unit 8 is capable of applying to the area corresponding to one pixel on the recording medium. The total amount control is a process for correcting the value of each pixel (density) in the primary color image data 30 and the spot color image data 32 so that the total amount of color materials applied to the area corresponding to one pixel on the recording medium becomes equal to or below the limitation.

The amount regulator 14 then outputs the primary color image data 30 (pieces of color image data 30C, 30M, 30Y, and 30K) and the spot color image data 32 having applied with the total amount regulation to the halftone generator 15.

The halftone generator 15 performs halftoning. The halftone generator 15 performs the halftoning to the primary color image data 30 (pieces of color image data 30C, 30M, 30Y, and 30K) and the spot color image data 32 received from the amount regulator 14.

The halftoning is a process of generating halftone data (pieces of primary color halftone data, and a piece of spot color halftone data) from the respective pieces of the primary color image data 30 (pieces of color image data 30C, 30M, 30Y, and 30K) and the spot color image data 32 both of which has each pixel specified with a pixel value representing a gradation value ranging from 0 to 255 represented by eight bits. This halftoning is sometimes referred to as a screen process. The halftoning performed by the halftone generator 15 is the same as a known screen process (gradation conversion process), except that the screen used in the process is the screen set by the screen setter 18. The halftone data is data represented by a group of halftone dots.

Specifically, the halftoning is a process of reducing the bits in the primary color image data 30 and the spot color image data 32. Each pixel in the primary color image data 30 and the spot color image data 32 is specified with a density value (pixel value) (sometimes referred to as a gradation value) ranging from 0 to 255, using an eight-bit representation.

The halftone generator 15 generates the primary color halftone data and the spot color halftone data by reducing the bits in the primary color image data 30 and the spot color image data 32. In the embodiment, the halftone generator 15 performs the halftoning by binarizing the pixel value (density value) at each pixel of the primary color image data 30 and the spot color image data 32 to generate the primary color halftone data and the spot color halftone data.

The receiver 16 receives a designation of type information. For example, the receiver 16 displays a display window for receiving a designation of type information on the panel apparatus 6.

FIG. 5 is a schematic illustrating an example of the display window 40. The display window 40 includes a list of type information. The type information included in the display window 40 matches the type information registered in the first information 26 stored in the storage unit 24 (first table 26A (see FIG. 4A)).

The user then selects a piece of type information corresponding to a desirable output resolution, by referring to the display window 40 displayed on the panel apparatus 6. In this manner, the user selects type information corresponding to the desirable screen. Referring back to FIG. 3, the receiver 16 then receives the piece of type information selected by the user.

The input information determiner 17 determines whether the type information received by the receiver 16 indicates halftoning using a screen, or halftoning not using any screen. The halftoning not using any screen means that the error diffusion is designated as the type information.

If the screen ID corresponding to the received type information in the first table 26A is any one of "ScreenID 1" to "ScreenID 4", the input information determiner 17 determines that some screen is used in the halftoning. The input information determiner 17 then outputs the screen ID corresponding to the received type information to the screen setter 18, the screen generator 19, and the halftone generator 15.

The input information determiner 17 then outputs the screen frequency and the screen angle corresponding to the spot color information mapped to the received screen ID in the second table 26B to the screen generator 19.

If the screen ID corresponding to the received type information in the first table 26A is "ScreenID 5", the input information determiner 17 determines that the process does not use any screen. The input information determiner 17 then sets the screen ID corresponding to the received type information to the halftone generator 15. With such a setting, the halftone generator 15 performs the error diffusion to the image data 34 received from the amount regulator 14.

The screen generator 19 generates a spot color screen. The spot color screen is a screen used in halftoning the spot color image data 32.

The screen generator 19 receives the type information received by the receiver 16 from the input information determiner 17. The screen generator 19 receives the screen ID mapped to the type information, and the screen frequency and the screen angle for the spot color information mapped to the screen ID from the input information determiner 17.

The screen generator 19 generates a spot color screen with the read screen frequency and screen angle. The screen generator 19 then stores generated spot color screen in the storage unit 24, in a manner mapped to the screen ID.

To explain more in detail, using the screen frequency and the screen angle for the spot color information received from the input information determiner 17, the screen generator 19 generates a screen exhibiting the screen frequency and the screen angle. The screen generator 19 then shifts the phase of the generated screen with respect to a first phase in the primary color screen corresponding to the primary color information, based on the screen ID mapped to the type information received from the input information determiner 17.

In this manner, the screen generator 19 generates a spot color screen having a phase shifted with respect to the first phase to a second phase.

The primary color screen is a screen used in halftoning the primary color image data 30. In the embodiment, it is assumed that the primary color screens for the primary color information corresponding to a screen ID are stored in the storage unit 24 in advance. These primary color screens for the primary color information include those for the CMYK colors. Each of these CMYK color screens exhibits the screen frequency and the screen angle indicated in the second table 26B.

In other words, in the embodiment, each of the CMYK color screens corresponding to the respective primary colors has a screen angle and a screen frequency that are different from those of the other colors.

As mentioned earlier, the screen frequency and the screen angle that are the same as those for the color information included in the primary color information are registered in the second table 26B in the first information 26, as the screen frequency and the screen angle for the spot color information. The screen generator 19 then generates a spot color screen having a phase shifted to the second phase from the first phase specified in one of the color screens corresponding to the respective different colors included in the primary colors.

In other words, the screen generator 19 generates a spot color screen having the same screen angle and the same screen frequency as those of one of the color screens, but having a different phase from that of the color screen. By using the same screen angle and screen frequency for the spot color screen and one of the primary color screens corresponding to the respective colors, formation of moire can be prevented.

The amount by which the phase is shifted from the first phase to the second phase (the amount of phases shift) when the spot color screen is generated may be stored in advance. The screen generator 19 may generate the spot color screen at the second phase by reading the amount of the phase shift, and shifting the first phase by that amount.

Figure 6A:
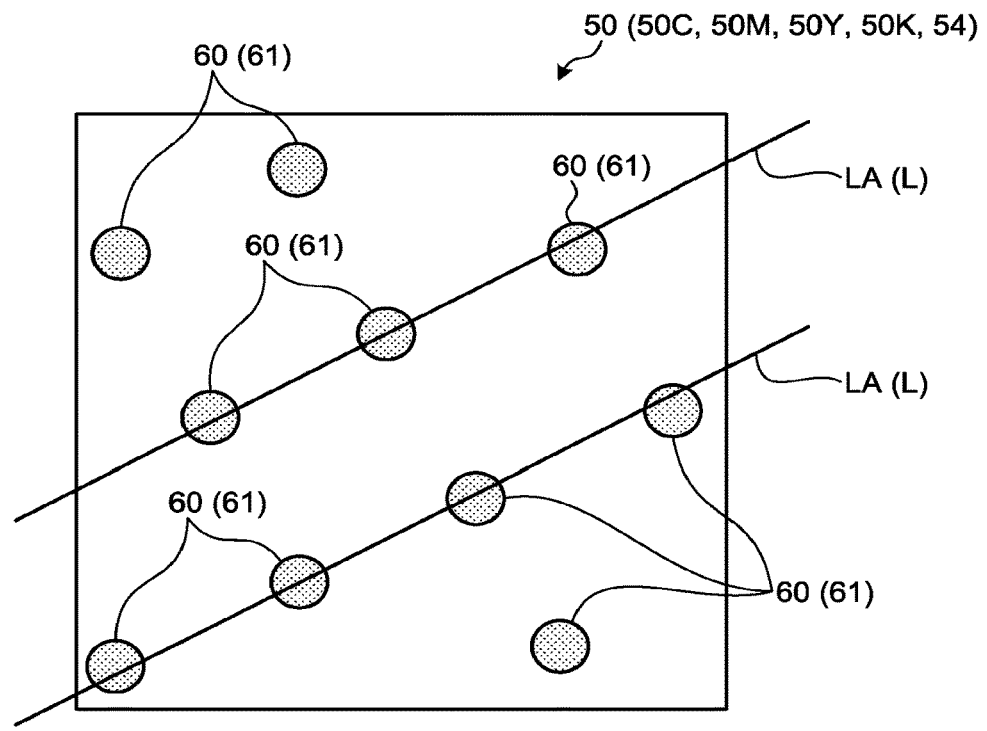
FIGS. 6A and 6B are schematics illustrating examples of screens.
Figure 6B:
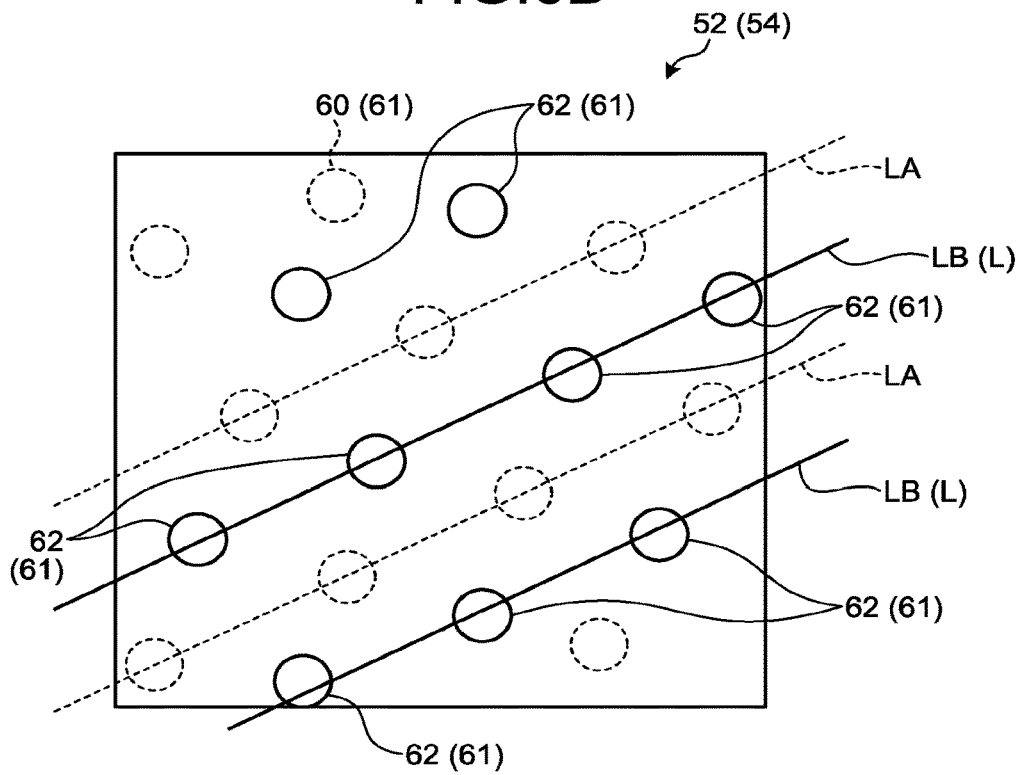

FIGS. 6A and 6B are schematics illustrating an example of the screen 54. As illustrated in FIG. 6A, the screen 54 is represented as cyclic arrangement of lines L of halftone dots 61 that are the areas to which the color material is to be applied.

FIG. 6A is a schematic illustrating an example of a primary color screen 50. As illustrated in FIG. 6A, the primary color screen 50 is a piece of pattern data including cyclic arrangement of lines of primary color halftone dots 60 representing the areas to which the primary color material is to be attached. The phase represented by the cyclic arrangement line LA of the primary color halftone dots 60 on the primary color screen 50 corresponds to the first phase.

The primary color screens 50 include the color screens (color screens 50C, 50M, 50Y, and 50K) corresponding to the respective primary colors. Each of these color screens (color screens 50C, 50M, 50Y, and 50K) exhibits a screen frequency and a screen angle for the corresponding color information (C, M, Y, K) included in the primary color information in the second table 26B (see FIG. 4B). Therefore, each of these color screens (color screens 50C, 50M, 50Y, and 50K) has a different screen frequency and screen angle from those of the others.

Illustrated in FIG. 6A is an example of a pattern in which the primary color halftone dots 60 are arranged in a color screen 50Y, which is one of the primary color screens 50.

FIG. 6B is a schematic illustrating an example of a spot color screen 52. As illustrated in FIG. 6B, the spot color screen 52 has a cyclic arrangement of lines of spot color halftone dots 62 that are areas to which the spot color material is to be attached. The phase represented by the cyclic arrangement of lines LB of the spot color halftone dots 62 on the spot color screen 52 corresponds to the second phase.

The spot color screen 52 exhibits the screen frequency and the screen angle mapped to the spot color information in the second table 26B (see FIG. 4B). Therefore, the screen frequency and the screen angle for the spot color screen 52 are the same as those mapped to one of the different pieces of color information included in the primary colors. In the example illustrated in FIGS. 4B and 6B, the spot color screen 52 has the same screen frequency and screen angle as those of the color screen 50Y for the Y color, but has a different phase, which is expressed by the arrangement of lines L.

The second phase that is the phase of the spot color screen 52 is different from the first phase of the primary color screen 50. For example, it is preferable for the second phase to be shifted by a ½ phase with respect to the first phase.

In the embodiment, the screen generator 19 generates a spot color screen 52 exhibiting such a phase relation.

Figure 7:
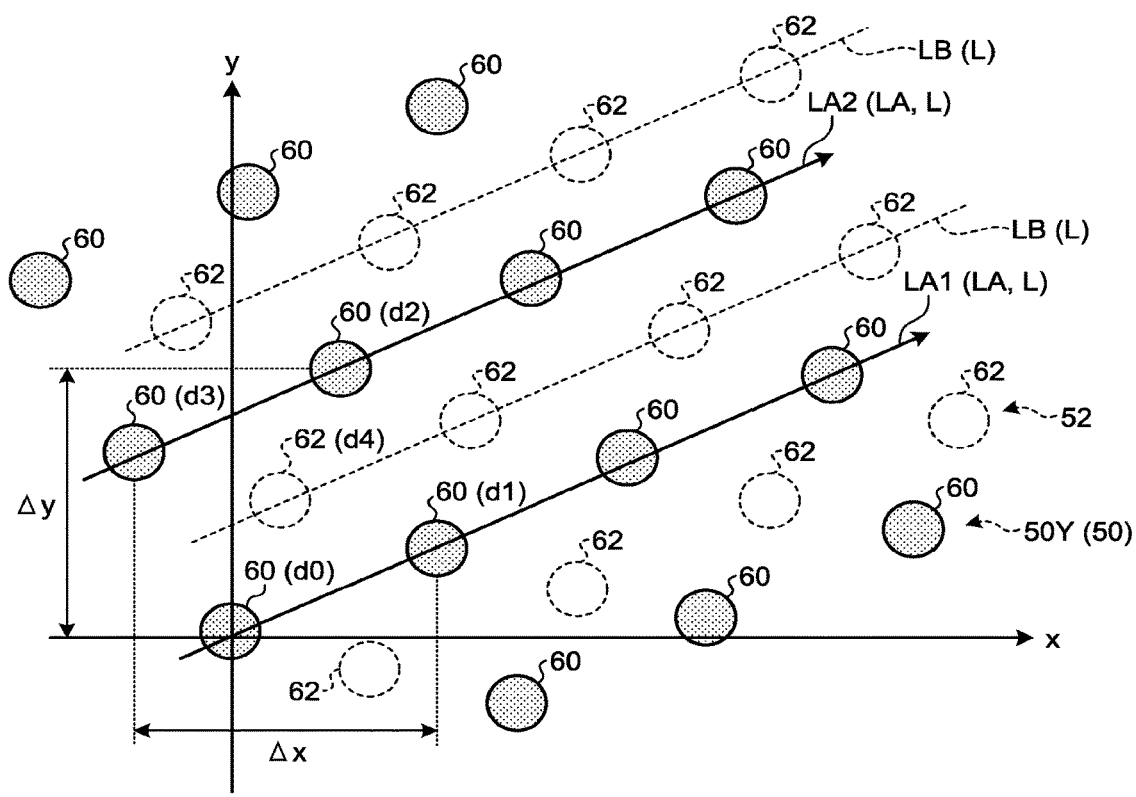
FIG. 7 is a schematic for explaining an example of how a spot color screen is generated.

The generation of the screen 54 will now be explained in detail. FIG. 7 is a schematic for explaining an example of how the spot color screen 52 is generated.

To begin with, the screen generator 19 reads the primary color screens 50 (the color screens 50C, 50M, 50Y, and 50K) for the CMYK colors included in the primary color information mapped to the screen ID received from the input information determiner 17, from the storage unit 24.

The screen generator 19 then generates the spot color screen 52. The screen generator 19 reads the screen ID received from the input information determiner 17, and the screen frequency and the screen angle for the spot color information mapped to the screen ID.

The screen generator 19 then identifies the color screen having the same screen frequency and screen angle as the those of the read spot color information, from the primary color screens 50 (the color screens 50C, 50M, 50Y, and 50K) mapped to the screen ID. It is assumed herein, as an example, that the screen generator 19 identifies the color screen 50Y.

The screen generator 19 then generates the spot color screen 52 by shifting the first phase of the identified color screen (for example, the color screen 50Y) to the second phase.

In other words, the screen generator 19 generates the spot color screen 52 by shifting the phase to the second phase, using the color screen corresponding to the color information and exhibiting the same screen frequency and screen angle as those of the spot color (for example, the color screen 50Y) as a reference.

To explain more in detail, it is assumed herein that the color screen 50Y is the color screen corresponding to the color information exhibiting the same screen frequency and screen angle. The screen generator 19 then sets one of the primary color halftone dots 60 represented in the color screen 50Y as a point of origin d0(x0, y0).

The screen generator 19 then establishes the line extended in the direction at 0 degrees from the point of origin d0 as x axis, and establishes the line extended in a direction at 90 degrees from the point of origin d0 as y axis. The screen generator 19 also establishes the line extended from the point of origin d0 in the main-scanning direction in a manner passing through a plurality of primary color halftone dots 60, as an arrangement line LA1, which is one of arrangement lines LA on the color screen 50Y. The main-scanning direction represents a direction perpendicular to a direction in which a recording medium is conveyed when an image is to be formed based on a piece of print data. The engine unit 8 is responsible for forming such an image and conveying the recording medium.

The screen generator 19 also establishes the primary color halftone dot 60 nearest to the point of origin d0 in sub-scanning direction as d3(x3, y3). The sub-scanning direction is a direction perpendicular to the main-scanning direction. A line extended from d3 in the main-scanning direction in a manner passing through a plurality of primary color halftone dots 60 is then established as an arrangement line LA2, which is one of the arrangement lines LA in the color screen 50Y.

The screen generator 19 then establishes the primary color halftone dot 60 nearest to the point of origin d0 in the direction of the arrangement line LA1 as d1(x1, y1), and establishes the primary color halftone dot 60 nearest to the primary color halftone dot 60 at d3 in the direction of the arrangement line LA2 as d2(x2, y2).

Under such assumptions, a distance Δx from the primary color halftone dot 60 established as d3 to the primary color halftone dot 60 established as d1 in the x-axis direction can be expressed as Δx=x1+x3. A distance Δy from the primary color halftone dot 60 established as d0 to the primary color halftone dot 60 established as d2 in the y-axis direction can be expressed as Δy=y2+y0.

The screen generator 19 then shifts the phase of the color screen 50Y by "n" in the x-axis direction and by "m" in y-axis direction, where "n" and "m" satisfy relations 0<m<1, and 0<n<1, respectively. In this manner, the screen generator 19 shifts the first phase of the color screen 50Y to the second phase. In this manner, the screen generator 19 generates the spot color screen 52.

Under the assumptions described above, the coordinates of the position of d4, which is one of the spot color halftone dots 62, in the spot color screen 52 can be expressed as (x, y)=(Δx×n, Δy×m).

The most preferable value for both of "n" and "m" is ½. In other words, it is preferable for the second phase to be shifted by ½ from the first phase. By using shifting the phase by ½, even when some displacement occurs in the position at which a primary color dot or a spot color dot is attached, the impact given to the hue can be minimized.

Using d4 that is one of the spot color halftone dots 62 as a reference point, the screen generator 19 generates a spot color screen 52 having the screen frequency and the screen angle mapped the type information received by the receiver 16.

In this manner, using the color screen corresponding to the color information having the same screen frequency and screen angle as a reference, the screen generator 19 generates the spot color screen 52 in which the phase is shifted by "n" in the x-axis direction, and by "m" in the y-axis direction. In other words, the screen generator 19 generates the spot color screen 52 by shifting the phase from the first phase to the second phase (also see FIG. 6B), using the color screen for the color information having the same screen frequency and screen angle as a reference.

Referring back to FIG. 3, the explanation is continued. The screen generator 19 then stores the generated spot color screen 52 in the storage unit 24, in a manner mapped to the screen ID and the spot color information.

The screen setter 18 identifies a screen ID mapped to the type information received by the receiver 16 from the first information 26. The screen setter 18 then outputs screens 54 (the primary color screens 50 (the color screens 50C, 50M, 50Y, and 50K) and the spot color screen 52) mapped to the identified screen ID to the halftone generator 15.

The halftone generator 15 includes a primary color halftone generator 15A and a spot color halftone generator 15B.

The primary color halftone generator 15A generates primary color halftone data from the primary color image data 30, using the screens 54 mapped to the screen ID identified by the screen setter 18 (the primary color screens 50 (the color screens 50C, 50M, 50Y, and 50K)). The primary color halftone data includes pieces of color halftone data corresponding to the CMYK colors included in the primary colors.

In other words, the primary color halftone generator 15A generates primary color halftone data (pieces of halftone data for the CMYK colors, respectively), each of which represents a corresponding piece of the primary color image data 30 (the color image data 30C, 30M, 30Y, and 30K) as a group of halftone dots (a group of primary color halftone dots 60), using the respective primary color screens 50 (the color screens 50C, 50M, 50Y, and 50K).

The spot color halftone generator 15B generates spot color halftone data from the spot color image data 32, using the spot color screen 52 mapped to the screen ID identified by the screen setter 18.

In other words, the spot color halftone generator 15B generates the spot color halftone data representing the spot color image data 32 as a group of halftone dots, using the spot color screen 52 having the second phase that is different from the first phase, which is represented by the cyclic arrangement of lines L of the halftone dots 61 specified in the primary color screen 50 (the primary color halftone dots 60).

In other words, the spot color halftone generator 15B generates the spot color halftone data using the spot color screen 52 having a phase shifted from the first phase specified in one of the color screens (the color screens 50C, 50M, 50Y, and 50K) corresponding to the respective different colors to the second phase.

The halftone generator 15 then outputs the generated spot color halftone data and primary color halftone data (CMYK color halftone data) to the engine unit 8, as the print data.

The engine unit 8 forms images on a recording medium based on the received print data. In other words, the engine unit 8 forms primary color images on the recording medium by applying primary color materials to the area corresponding to the primary color halftone dots 60 that are specified in the primary color halftone data, which is included in the print data. To explain more in detail, the engine unit 8 forms CMYK primary color images on the recording medium by applying the primary color materials of the corresponding colors, using the pieces of halftone data corresponding to the CMYK colors included in the primary color halftone data.

The engine unit 8 also forms a spot color image on the recording medium by applying the spot color material to the area corresponding to the spot color halftone dots 62 that are specified in the spot color halftone data, which is included in the print data.

As mentioned earlier, the spot color screen 52 is a screen having the second phase that is different from the first phase represented by the cyclic arrangement of lines L of the halftone dots 61 specified in the primary color screen 50 (the primary color halftone dots 60).

Therefore, the dots achieved by the primary color material and the dots achieved by the spot color material are formed at positions displaced from one another, correspondingly to the amount by which the phase is shifted, on the recording medium P.

Figure 8:
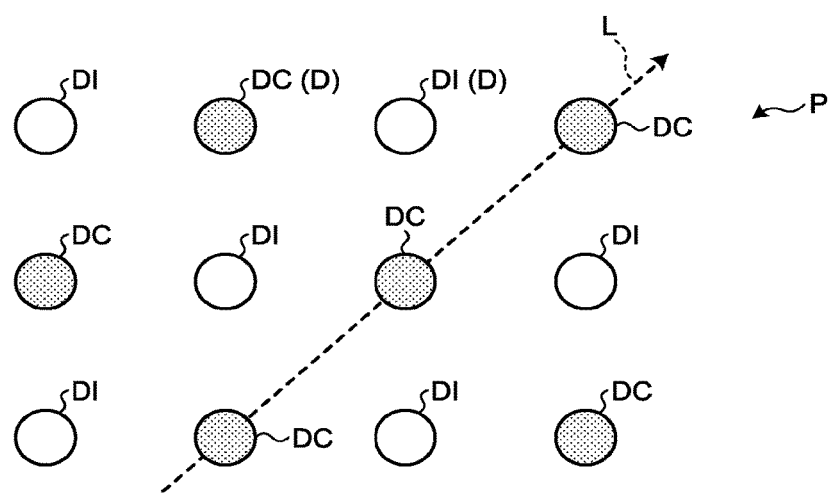
FIG. 8 is a schematic illustrating an example of a positional relation between spot color dots and primary color dots.
Figure 9:
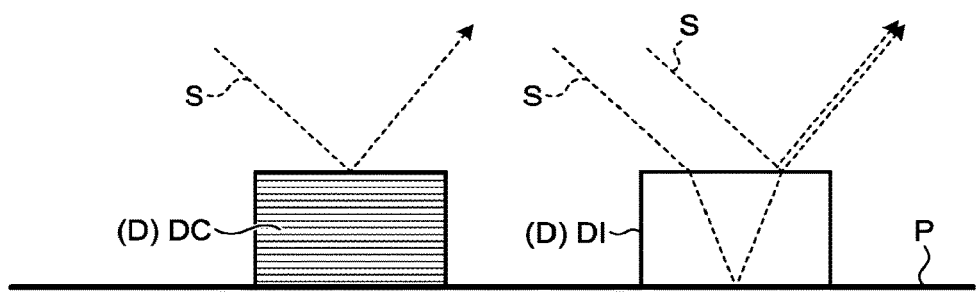
FIG. 9 is a schematic illustrating an example of a positional relation between spot color dots and primary color dots.

FIGS. 8 and 9 are schematics illustrating an example of a positional relation between spot color dots DI and primary color dots DC formed on the recording medium P. As illustrated in FIG. 8, the spot color dots DI and the primary color dots DC are formed at positions displaced from one another on the recording medium P, correspondingly to the phase shift on the screens.

In the embodiment, therefore, as illustrated in FIG. 9, the primary color dots DC and the spot color dots DI are formed at positions displaced from one another on the recording medium P, correspondingly to the amount by which the phase is shifted on the screens used in the halftoning. Therefore, the light interference between the light S having reached the area covered by the primary color dots DC and the light S having reached area covered by the spot color dots DI can be suppressed.

Figure 10:
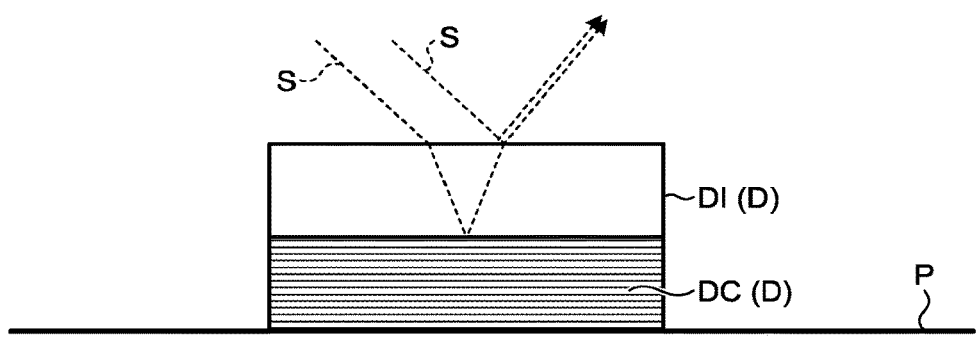
FIG. 10 is a schematic illustrating a conventional positional relation between primary color dots and spot color dots.

By contrast, the light interference between the light S having reached the area covered by the primary color dots DC and the light S having reached area covered by the spot color dots DI have conventionally occurred. FIG. 10 is a schematic illustrating an example of a positional relation between the primary color dots DC and the spot color dots DI formed on the recording medium P using a conventional technique.

As illustrated in FIG. 10, with the conventional technique, a spot color dot DI has been formed over a primary color dot DC in an overlapping manner, at an area corresponding to one pixel on the recording medium P. As a result, the light S reflected on the surface of the primary color dot DC interfered with the light S reflected on the surface of the spot color dot DI. Therefore, with the conventional technique, reproducibility has deteriorated.

By contrast, the image processing apparatus 10 according to the embodiment can achieve the spot color effect of the spot color material without deteriorating the color achieved by the primary color material.

A sequence the of image processing executed by the image processing apparatus 10 according to the embodiment will now be explained.

Figure 11:
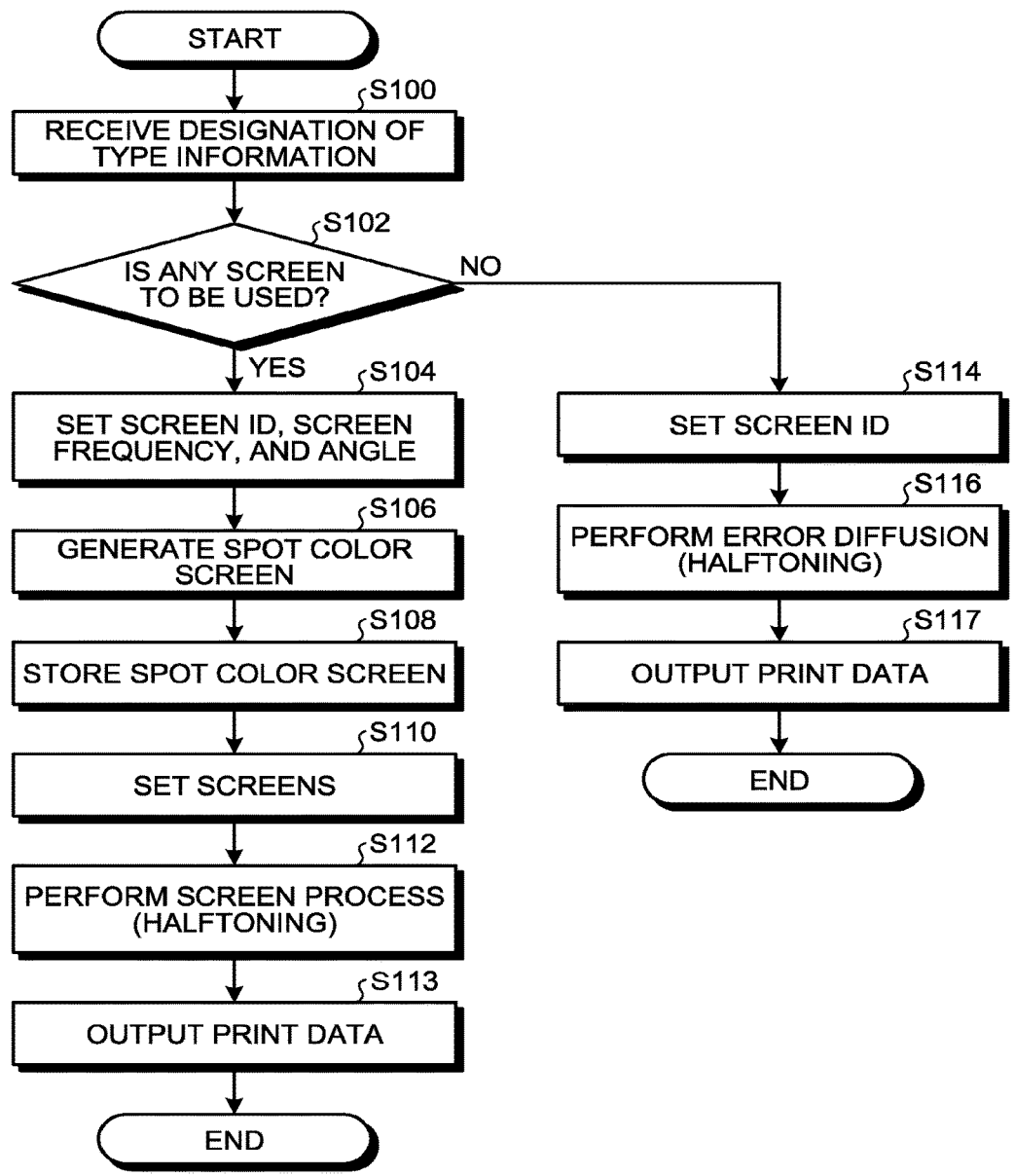
FIG. 11 is a flowchart illustrating an example of the sequence of image processing.

FIG. 11 is a flowchart illustrating an example of the sequence of the image processing executed by the image processing apparatus 10 according to the embodiment. Explained below is an example assuming the acquirer 11 has already acquired the image data 34, and the image data 34 (the primary color image data 30, the spot color image data 32) processed by the gamma converter 13 and the amount regulator 14 has been output to the halftone generator 15.

To begin with, the receiver 16 receives a designation of type information (Step S100). For example, the receiver 16 displays the display window 40 illustrated in FIG. 5. The user then selects a piece of type information corresponding to a desirable output resolution by referring to the display window 40 displayed on the panel apparatus 6. The receiver 16 then receives the piece of type information selected by the user.

The input information determiner 17 then determines whether the type information received at Step S100 indicates halftoning using a screen, or halftoning not using any screen (Step S102).

If the input information determiner 17 determines that some screen is used in the halftoning (Yes at Step S102), the process is shifted to Step S104. At Step S104, the input information determiner 17 sets (outputs) the screen ID mapped to the type information received at Step S100, and the screen frequency and the screen angle corresponding to each piece of the primary color information (color information) and the spot color information that are mapped to the screen ID to the halftone generator 15, the screen setter 18, and the screen generator 19 (Step S104).

The screen generator 19 then generates a spot color screen 52 (Step S106). In the process routine illustrated in FIG. 11, it is assumed that the screen generator 19 has generated and stored the primary color screens 50 in the storage unit 24 in advance.

At Step S106, the screen generator 19 reads the screen frequency and the screen angle mapped to the screen ID and the spot color information that are set at Step S104 from the second table 26B in storage unit 24. The screen generator 19 then generates a screen exhibiting the screen frequency and the screen angle, using the read screen frequency and screen angle corresponding to the spot color information. The screen generator 19 also shifts the phase of the generated screen with respect to the first phase in the primary color screen 50 exhibiting the screen frequency and the screen angle corresponding to the type information and the primary color information set at Step S104. In this manner, the screen generator 19 generates a spot color screen 52 at the second phase that is a phase shifted with respect to the first phase.

The screen generator 19 then stores the generated spot color screen 52 in the storage unit 24, in a manner mapped to the screen ID and the spot color information (Step S108).

The screen setter 18 then identifies the screen ID mapped to the type information received at Step S100 from the first information 26. The screen setter 18 outputs the screens 54 mapped to the identified screen ID (the primary color screens 50 (the color screens 50C, 50M, 50Y, and 50K) and the spot color screen 52) to the halftone generator 15. In this manner, the screen setter 18 sets (outputs) the screens 54 to be used in the halftoning to the halftone generator 15 (Step S110).

The halftone generator 15 then performs the screen process (halftoning) to each piece of the primary color image data 30 and the spot color image data 32 using the corresponding screen 54 set at Step S110 (Step S112).

At Step S112, the primary color halftone generator 15A in the halftone generator 15 generates the primary color halftone data from the primary color image data 30 using the primary color screens 50 (the color screens 50C, 50M, 50Y, and 50K) set by the screen setter 18. In other words, the primary color halftone generator 15A generates the primary color halftone data (pieces of halftone data for the respective CMYK colors) each representing the corresponding piece of primary color image data 30 (the color image data 30C, 30M, 30Y, or 30K) as a group of halftone dots (a group of primary color halftone dots 60), using the corresponding primary color screen 50 (the color screens 50C, 50M, 50Y, or 50K).

At Step S112, the spot color halftone generator 15B in the halftone generator 15 generates the spot color halftone data from the spot color image data 32 using the spot color screen 52 set by the screen setter 18.

In other words, the spot color halftone generator 15B generates the spot color halftone data representing the spot color image data 32 as a group of halftone dots, using the spot color screen 52 having the second phase that is different from the first phase, represented by the cyclic arrangement of lines L of the halftone dots 61 specified in the primary color screen 50 (the primary color halftone dots 60).

The halftone generator 15 then outputs print data including the generated primary color halftone data and spot color halftone data to the engine unit 8 (Step S113), and the routine is ended.

If the input information determiner 17 determines that no screen is used in the halftoning in the determination at Step S102 (No at Step S102), the process is shifted to Step S114. At Step S114, the screen setter 18 sets (outputs) the screen ID mapped to the type information received at Step S100, and the halftoning type mapped to the screen ID (in this example, the error diffusion) to the halftone generator 15 (Step S114).

The halftone generator 15 then performs the halftoning by performing the error diffusion to each piece of the primary color image data 30 and the spot color image data (Step S116). In this manner, the halftone generator 15 can generate the spot color halftone data even when the halftoning is error diffusion using neither screen frequency nor screen angle.

The halftone generator 15 then outputs print data including the primary color halftone data and the spot color halftone data generated as a result of error diffusion to the engine unit 8 (Step S117), and the routine is ended.

As explained above, the image processing apparatus 10 according to the embodiment includes the acquirer 11, the primary color halftone generator 15A, and the spot color halftone generator 15B. The acquirer 11 acquires the image data 34 including the primary color image data 30 in a primary color, and the spot color image data 32 in a spot color. The primary color halftone generator 15A generates the primary color halftone data representing the primary color image data 30 as a group of halftone dots, using the primary color screen 50 specified with cyclic arrangement of lines L of the halftone dots 61 (primary color halftone dots 60). The spot color halftone generator 15B generates the spot color halftone data using the spot color screen 52 representing the spot color image data 32 as a group of halftone dots at the second phase that is different from the first phase represented by the cyclic arrangement lines LA specified in the primary color screen 50.

In the manner described above, the spot color screen 52 used in the embodiment is a screen having the second phase that is different from the first phase represented by the cyclic arrangement of lines L of the halftone dots 61 specified in the primary color screen 50 (the primary color halftone dots 60). Therefore, the dots of the primary color material formed on the recording medium P based on the primary color halftone data are formed at positions displaced from the dots of the spot color material formed on the recording medium P based on the spot color halftone data, correspondingly to the amount by which the phase is shifted.

Therefore, the interference between the light having reached area covered by the primary color dots and the light having reached area covered by the spot color dot can be suppressed. In other words, as explained with reference to FIG. 9, in the embodiment, because the primary color dots DC and the spot color dots DI are formed at positions displaced from one another on the recording medium P, correspondingly to the amount by which the phase is shifted in the screens used in the halftoning, the light interference between the light S having reached the area covered by the primary color dots DC and the light S having reached area covered by the spot color dots DI can be suppressed.

Therefore, the image processing apparatus 10 according to the embodiment can achieve the spot color effect of the spot color material without deteriorating the color achieved by the primary color materials.

It is preferable for the spot color to be transparent (transparent with no color). When the spot color is transparent, the light interference is most likely to occur. Therefore, when the spot color is transparent (transparent with no color) the image processing apparatus 10 according to the embodiment can achieve the spot color effect of the spot color material without deteriorating the color achieved by the primary color material, particularly effectively.

The primary color image data 30 includes a plurality of pieces of color image data with different colors (the color image data 30C, 30M, 30Y, and 30K). The primary color screens 50 include color screens corresponding to the respective different colors and having the screen angles and the screen frequencies that are different from one another (the color screens 50C, 50M, 50Y, and 50K). The spot color halftone generator 15B generates the spot color halftone data using the spot color screen 52 having a phase shifted from the first phase specified in one of the color screens 50C, 50M, 50Y, and 50K corresponding to the respective different colors, to the second phase.

The storage unit 24 stores therein the first information 26. The first information 26 is information mapping the type information indicating a halftoning type, with the screen frequencies and the screen angles corresponding to respective pieces of the primary color information representing the primary colors, and to the spot color information representing the spot color. The receiver 16 receives a designation of type information. The screen generator 19 generates a spot color screen 52 by shifting the phase specified in the screen exhibiting the screen frequency and the screen angle corresponding to the received type information and the spot color information, from the first phase specified in the primary color screen 50 exhibiting the screen frequency and the screen angle corresponding to the received type information and to the primary color information, to the second phase.

It is preferable, for the spot color halftone generator 15B, to generate the spot color halftone data by using the spot color screen 52 in which the first phase specified in the color screen corresponding to the black color (the color screen 50K), among those of different colors is shifted to the second phase.

Second Embodiment

Explained in the first embodiment is an example in which the screen frequency and the screen angle corresponding to each piece of the primary color information and the spot color information are registered in the first information 26 (see FIG. 4B) in advance. Furthermore, explained in the first embodiment is an example in which the primary color screens 50 are generated in advance, and the spot color screen 52 is generated by the screen generator 19.

Explained in a second embodiment of the present invention is an example in which the user sets values, as the screen frequency and the screen angle corresponding to the primary color information. Explained in the embodiment is also an example in which the screen generator 19 generates not only the spot color screens 52 but also the primary color screens 50.

Figure 12:
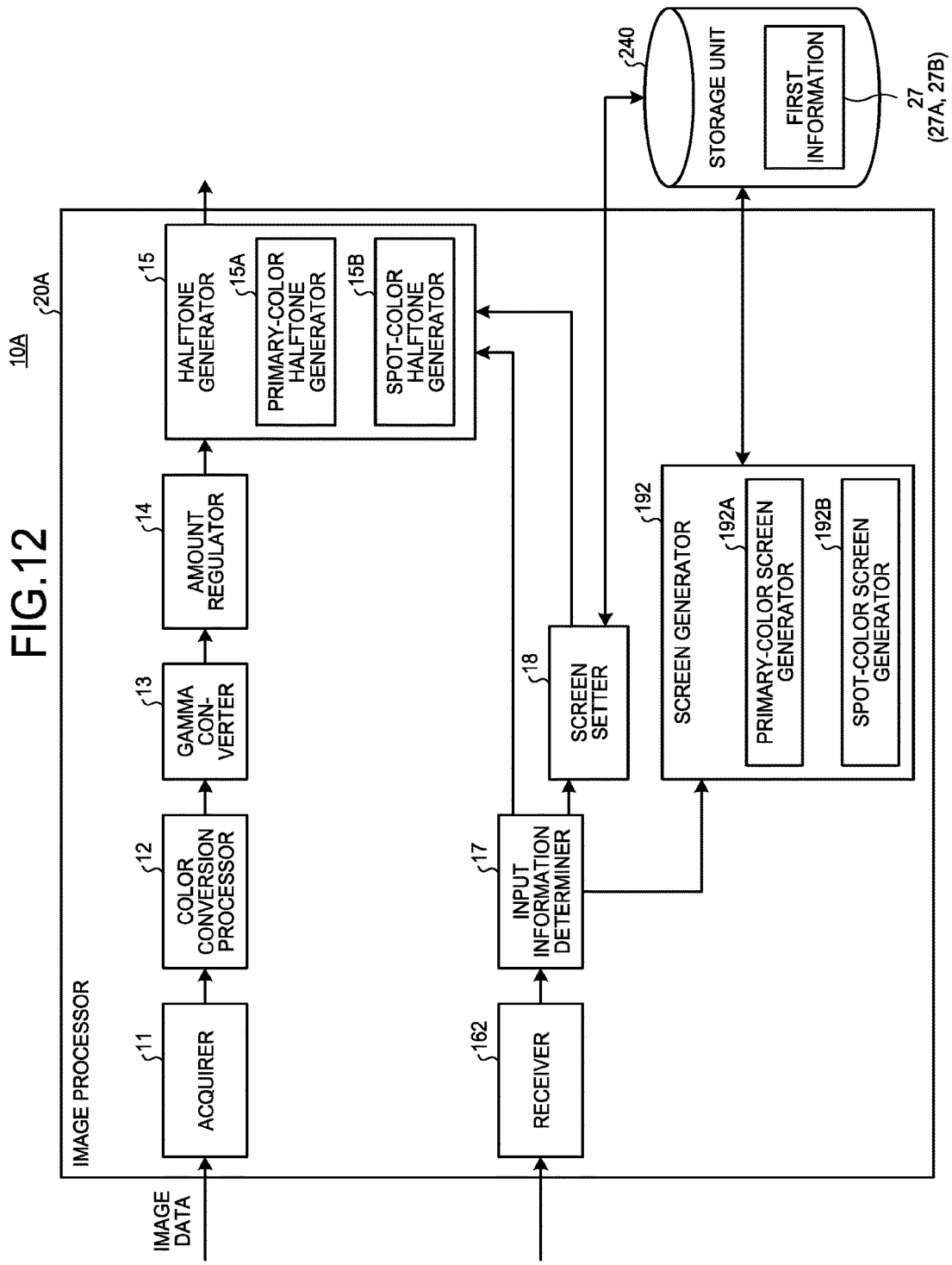
FIG. 12 is a block diagram illustrating a functional configuration of the image processing apparatus.

FIG. 12 is a block diagram illustrating a functional configuration of an image processing apparatus 10A according to the embodiment. A hardware configuration of the image processing apparatus 10A is the same as that of the image processing apparatus 10 according to the first embodiment (see FIG. 1).

The image processing apparatus 10A includes an image processor 20A and a storage unit 240. The image processor 20A and the storage unit 240 are connected in a manner enabled to transmit and to receive data or a signal to and from each other.

The storage unit 240 stores therein various types of information. An example of the storage unit 240 includes an HDD.

In the embodiment, the storage unit 240 stores therein first information 27. The first information 27 is information used in halftoning performed by the image processor 20A.

FIGS. 13A and 13B are schematics illustrating an example of a data structure of the first information 27. The first information 27 maps a piece of type information with a screen frequency and a screen angle corresponding to each piece of the primary color information and the spot color information.

Explained in the embodiment is an example in which the first information 27 is used in a manner divided into a first table 27A and a second table 27B. The first table 27A and the second table 27B may be provided integrally as one table or one data base.

FIG. 13A is a schematic illustrating an example of a data structure of the first table 27A. The first table 27A is a piece of data for mapping a piece of type information with a screen ID and a halftoning type, in the same manner as the first table 26A according to the first embodiment. In the embodiment, the first table 27A also includes "user customization" as the type information. The type information "user customization" indicates a screen having a screen angle and a screen frequency designated by a user.

FIG. 13B is a schematic illustrating an example of a data structure of the second table 27B. The second table 27B is a piece of data for mapping a screen ID with a screen frequency and a screen angle corresponding to each piece of the primary color information and the spot color information, in the same manner as the second table 26B according to the first embodiment. In the embodiment, the second table 27B includes "ScreenID 6", as a screen ID, indicating a screen having the screen frequency and the screen angle set by the user in addition to those registered in the second table 26B.

The screen frequencies and the screen angles corresponding to the primary color information mapped to the ScreenID 6 in the second table 27B are set by a user. In addition, in the embodiment, the screen frequencies and the screen angles corresponding to the spot color information mapped to ScreenID 6 are used without being registered in the second table 27B.

Referring back to FIG. 12, the explanation is continued. The image processor 20A includes the acquirer 11, the color conversion processor 12, the gamma converter 13, the amount regulator 14, the halftone generator 15, a receiver 162, the input information determiner 17, the screen setter 18, and a screen generator 192. The image processor 20A has the same configuration as the image processor 20 according to the first embodiment, except for having the receiver 162 and the screen generator 192, instead of the receiver 16 and the screen generator 19.

The receiver 162 receives a designation of type information, and inputs of screen frequencies and screen angles corresponding to the primary color information. For example, the receiver 162 displays a display window for receiving a designation of type information on the panel apparatus 6.

Figure 14A:
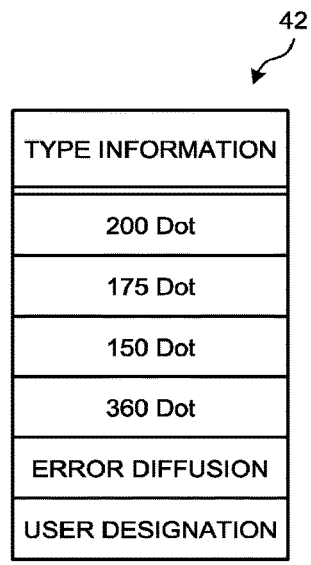
FIGS. 14A and 14B are schematics illustrating an example of display windows.
Figure 14B:
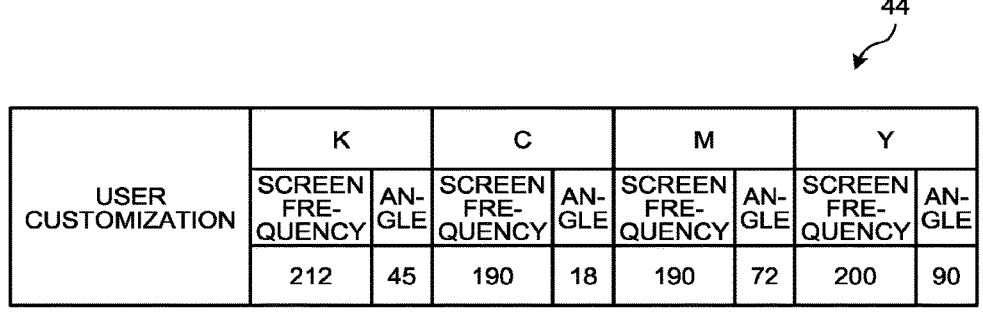

FIGS. 14A and 14B are schematics illustrating an example of display windows. FIG. 14A is a schematic illustrating an example of a display window 42. FIG. 14B is a schematic illustrating an example of a display window 44.

The display window 42 includes a list of type information. The type information included in the display window 42 matches the type information registered in the first information 27 stored in the storage unit 240 (the first table 27A (see FIG. 13A)). Therefore, in the embodiment, the display window 42 includes "user customization" as the type information.

The user selects a desirable piece of type information, by referring to the display window 42 displayed on the panel apparatus 6. Explained in the embodiment is an example in which the user selects the type information "user customization".

Once the user selects the type information "user customization", the receiver 162 receives the type information "user customization". The receiver 162 then displays the display window 44 for receiving inputs of a screen frequency and a screen angle corresponding to each piece of color information included in the primary color information on the panel apparatus 6. For example, the display window 44 illustrated in FIG. 14B is displayed on the panel apparatus 6.

The user then inputs screen angles and screen frequencies that are different from one another, correspondingly to the respective different colors (C, M, Y, K), by operating the panel apparatus 6 while referring to the display window 44.

The receiver 162 receives the setting information including the screen angles and the screen frequencies corresponding to the respective pieces of color information representing the different colors included in the primary colors (the CMYK colors).

The screen generator 192 generates primary color screens and a spot color screen. The screen generator 192 includes a primary color screen generator 192A and a spot color screen generator 192B.

For each of the different colors (CMYK colors), the primary color screen generator 192A generates a color screen (the color screen 50C, 50M, 50Y, or 50K) having the screen frequency and the screen angle that are included in the setting information received by the receiver 162.

The way in which the color screens (color screens 50C, 50M, 50Y, and 50K) are generated is the same as that according to the first embodiment, except that used are the screen angles and the screen frequencies corresponding to the respective pieces of color information included in the setting information received by the receiver 162.

The spot color screen generator 192B generates a spot color screen 52 having a phase shifted from the first phase specified in one of the color screens (the color screens 50C, 50M, 50Y, and 50K) corresponding to the respective different colors, to the second phase.

The spot color screen generator 192B may generate the spot color screen 52 by shifting the phase from the first phase to the second phase in the same manner as in the first embodiment, except that the spot color screen generator 192B uses one of the color screens (the color screens 50C, 50M, 50Y, and 50K) created by the primary color screen generator 192A, as the screen from which the phase is shifted.

As the screen from which the phase is shifted, the spot color screen generator 192B uses that of a color that interferes with the other colors by the least degree, among the color screens (color screens 50C, 50M, 50Y, and 50K) generated by the primary color screen generator 192A. For example, the spot color screen generator 192B uses the color screen 50K corresponding to the black color. This is because the hues of the image remain unchanged even when the black is emphasized, and therefore, the color reproducibility in the hue direction deteriorates less.

A sequence of the image processing executed by the image processing apparatus 10A according to the embodiment will now be explained.

Figure 15:
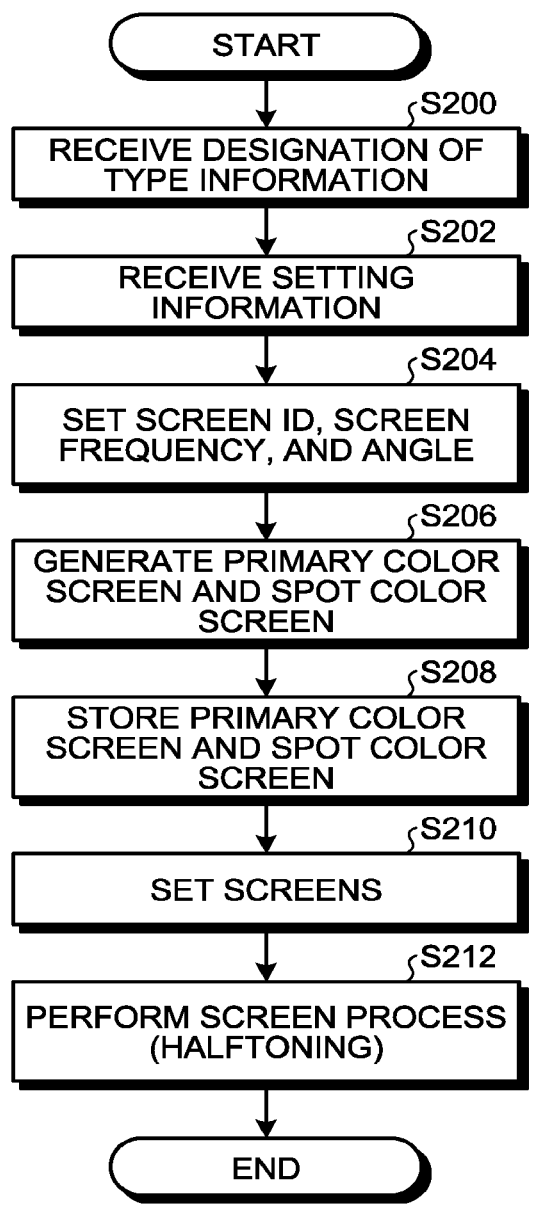
FIG. 15 is a flowchart illustrating an example of the sequence of image processing.

FIG. 15 is a flowchart illustrating an example of the sequence of image processing executed by the image processing apparatus 10A according to the embodiment. Explained below is an example assuming that the acquirer 11 has already acquired the image data 34, and the image data (the primary color image data 30, the spot color image data 32) processed by the gamma converter 13 and the amount regulator 14 has already been output to the halftone generator 15. Also explained in the embodiment is an example in which the "user customization" is selected as the designation of type information.

To begin with, the receiver 162 receives the designation of type information (Step S200). For example, the receiver 162 displays the display window 42 illustrated in FIG. 14A. The user selects a desirable piece of type information by referring to the display window 42 displayed on the panel apparatus 6. Explained in the embodiment is an example in which the type information "user customization" is selected. The receiver 162 receives the type information "user customization" selected by the user.

The receiver 162 then receives the setting information including the screen angles and the screen frequencies corresponding to the respective pieces of color information representing the different colors included in the primary colors (CMYK colors) (Step S202). For example, the receiver 162 receives the inputs of the screen frequencies and the screen angles for the respective colors by displaying the display window 44 illustrated in FIG. 14B.

The input information determiner 17 then sets the received screen ID, the screen frequencies, and the angles (Step S204).

The screen generator 192 then generates the primary color screens 50 and the spot color screen 52, using the setting information received at Step S202 (Step S206).

The screen generator 192 then stores the generated primary color screens 50 and the spot color screen 52 in the storage unit 240, in a manner mapped to the screen ID (Step S208).

The screen setter 18 identifies the screen ID mapped to the type information received at Step S200 from the first information 27. The screen setter 18 then reads the screens 54 mapped to the identified screen ID (the primary color screens 50 (the color screens 50C, 50M, 50Y, and 50K) and the spot color screen 52) from the storage unit 240, and outputs the screens 54 to the halftone generator 15. In this manner, the screen setter 18 sets the screens 54 used in the halftoning to the halftone generator 15 (Step S210).

The halftone generator 15 then performs the screen process (halftoning) to each piece of the primary color image data 30 and the spot color image data 32, using the corresponding screen 54 set at Step S210 (Step S212). The process at Step S212 is the same as Step S112 (see FIG. 11). The routine is then ended.

As explained above, the image processing apparatus 10A according to the embodiment includes the second receiver (the receiver 162), the primary color screen generator 192A, and the spot color screen generator 192B. The receiver 162 receives setting information including the screen frequencies and screen angles corresponding to the pieces of color information representing the respective different colors included in the primary colors. The primary color screen generator 192A then generates, for each of the different colors, a color screen (the color screen 50C, 50M, 50Y, or 50K) with the screen frequency and the screen angle included in the received setting information. The spot color screen generator 192B generates a spot color screen 52 having a phase shifted from the first phase specified in one of the color screens (the color screens 50C, 50M, 50Y, and 50K) corresponding to the respective different colors, to the second phase.

In the manner described above, in the embodiment as well, the image processing apparatus 10A generates a spot color screen 52 having a phase shifted from the first phase in the primary color screen 50 to the second phase.

Therefore, even when the values are set as the screen frequencies and the screen angles corresponding to the primary color information, the user can achieve the spot color effect of the spot color material without deteriorating the color achieved by the primary color materials, in the same manner as in the first embodiment.

First Modification

Explained in the second embodiment above is an example in which the primary color screens 50 are generated using the screen frequencies and the screen angles included in the setting information set by a user. The screen frequency and the screen angle may, however, also be set by the user not only for the primary color screens 50 but also for the spot color screen 52.

In such a case, the receiver 162 (third receiver) may receive setting information including the screen angles and the screen frequencies corresponding to the respective pieces of color information representing the respective different colors included in the primary colors (CMYK colors), and the screen angle and the screen frequency corresponding to the spot color information representing the spot color.

In such a case, for example, the receiver 162 may display a display window for receiving inputs of the screen frequencies and screen angles corresponding to the respective pieces of the primary color information and the spot color information on the panel apparatus 6. FIG. 16 is a schematic illustrating an example of a display window 46. For example, the receiver 162 displays the display window 46 illustrated in FIG. 16 on the panel apparatus 6.

The user then inputs the screen angle and the screen frequency corresponding to each of the different colors (C, M, Y, K) and the spot color, by operating the panel apparatus 6 while referring to the display window 46.

Through this process, the receiver 162 receives the setting information including the screen angles and the screen frequencies corresponding to the respective pieces of color information representing the respective different colors included in the primary colors (CMYK colors), and the screen angle and the screen frequency corresponding to the spot color information representing the spot color.

The primary color screen generator 192A in the screen generator 192 may then generate the primary color screens (color screens 50C, 50M, 50Y, and 50K), in the same manner as in the second embodiment. In other words, the primary color screen generator 192A may generate, for the respective different colors, the color screens (50C, 50M, 50Y, and 50K) with the screen frequencies and the screen angles corresponding to the respective pieces of color information included in the received setting information.

By contrast, the spot color screen generator 192B may generate a spot color screen 52 having the screen frequency and the screen angle corresponding to the spot color information included in the received setting information, and having a phase shifted from the first phase specified in one of the color screens (50C, 50M, 50Y, and 50K) corresponding to the respective different colors, to the second phase.

In the manner described above, by allowing a user to set the screen frequency and the screen angle for the spot color screen 52 as well, the effect resultant of the spot color material, such as gloss, can be prioritized over the color reproducibility resultant of the primary color materials, in addition to the effect achieved by the embodiments described above.

Second Modification

Explained in the embodiments above is an example in which the amount by which the phase is shifted from the first phase to the second phase (amount of the phase shift) is stored in advance, and the phase is shifted by reading the shift amount when the spot color screen 52 is generated.

The amount by which the phase is shifted from the first phase to the second phase (in other words, the amount of the phase shift) may however be enabled to be set by a user.

In such a case, the receiver 162 (fourth receiver) may also receive phase shift information indicating the amount by which the phase is shifted between the first phase and the second phase, in addition to the setting information.

In such a case, for example, the receiver 162 displays a display window for receiving inputs of a screen frequency and a screen angle corresponding to each piece of the primary color information and the spot color information, and the amount of the phase shift, on the panel apparatus 6. FIG. 17 is a schematic illustrating an example of a display window 48. For example, the receiver 162 displays the display window 48 illustrated in FIG. 17 on the panel apparatus 6.

A user inputs the screen angles and the screen frequencies corresponding to the different colors (C, M, Y, K) and to the spot color, by operating the panel apparatus 6 while referring to the display window 48. The user also inputs the phase shift information indicating the amount by which the phase is shifted in each of the x-axis direction and the y-axis direction. In FIG. 17, the phase (x, y) is the phase shift information indicating the amount by which the phase is shifted in the x-axis direction and the y-axis direction. The shift of the phase in each of the x-axis direction and the y-axis direction has been explained in the first embodiment with reference to FIG. 7, so that the explanations thereof are omitted herein.

Through this process, the receiver 162 receives not only the setting information, but also the phase shift information indicating the amount by which the first phase and the second phase are shifted.

The primary color screen generator 192A in the screen generator 192 may then generate the primary color screens (color screens 50C, 50M, 50Y, and 50K), in the same manner as in the second embodiment. In other words, the primary color screen generator 192A may generate, for the respective types of colors, the color screens (50C, 50M, 50Y, and 50K) having the screen frequencies and the screen angles corresponding to the respective pieces of color information included in the received setting information.

The spot color screen generator 192B may generate the spot color screen 52 having the screen frequency and the screen angle corresponding to the spot color information included in the received setting information, and having the second phase resultant of shifting the first phase specified in one of the color screens (50C, 50M, 50Y, and 50K) corresponding to the respective different colors by the amount of the phase shift specified in the received phase shift information.

In the manner described above, by allowing a user to set the amount by which the phase is shifted from the first phase to the second phase (in other words, the amount of phase shift), more precise adjustments become possible, in addition to the effects achieved by the embodiments and the modification described above.

Third Modification

Explained above in the embodiment is an example in which the spot color screen 52 is generated. It is however also possible to store the spot color screen 52 explained in the embodiments and the modifications in advance. The primary color screens 50 and the spot color screen 52 stored in advance may be read before the halftoning, and the halftoning may then be performed.

Figure 18:
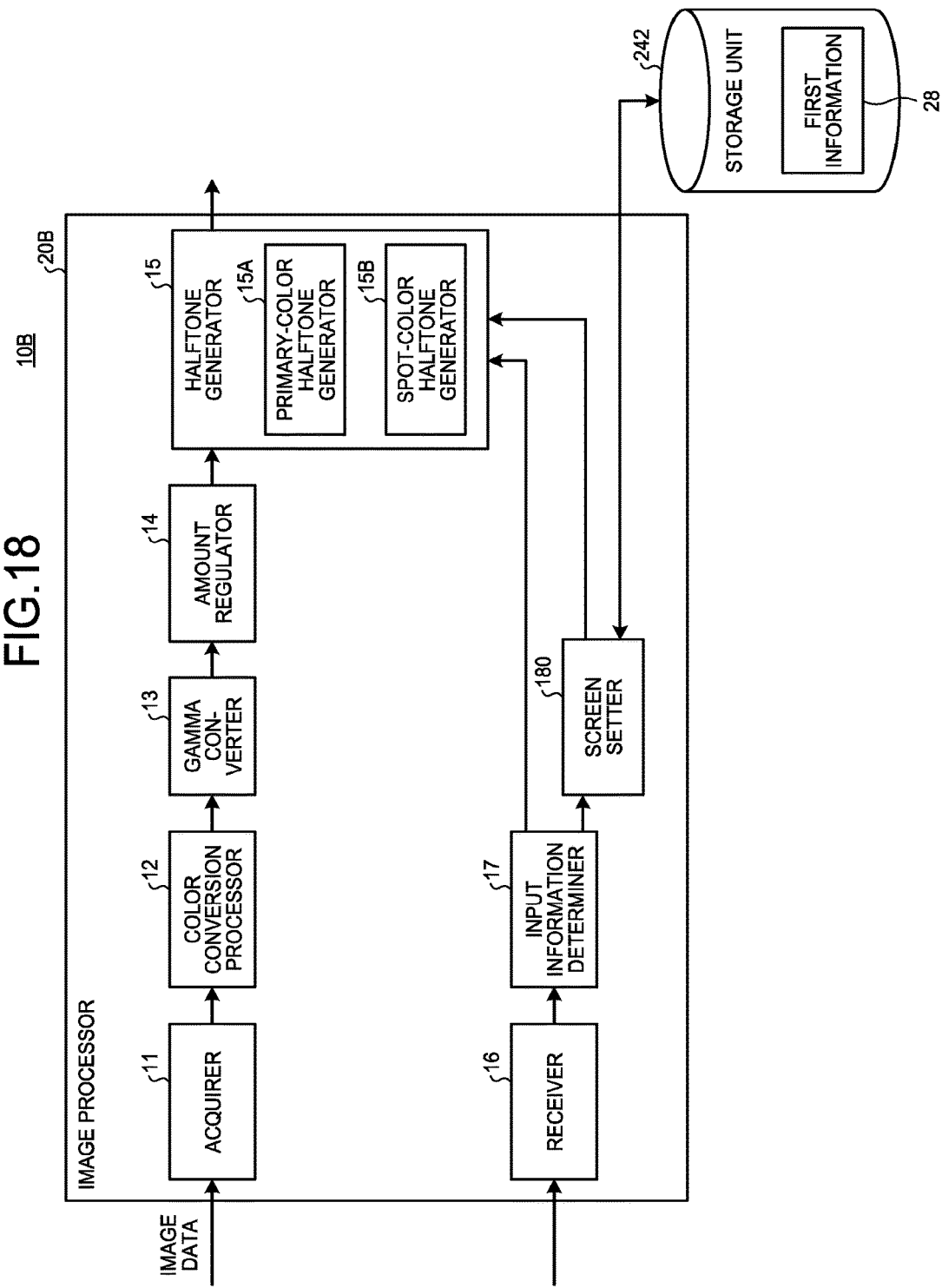
FIG. 18 is a block diagram illustrating a functional configuration of the image processing apparatus.

FIG. 18 is a block diagram illustrating a functional configuration of the image processing apparatus 10B according to the modification. A hardware configuration of the image processing apparatus 10B is the same as that of the image processing apparatus 10 according to the first embodiment (see FIG. 1).

The image processing apparatus 10B includes an image processor 20B and a storage unit 242. The image processor 20B and the storage unit 242 are connected in a manner enabled to transmit and to receive data or a signal to and from each other.

The storage unit 242 stores therein various types of information. An example of the storage unit 242 includes an HDD. In this modification, the storage unit 242 stores therein the first information 28. The first information 28 is information used in the halftoning performed by the image processor 20B.

FIG. 19 is a schematic illustrating an example of a data structure of the first information 28. The first information 28 is a piece of data for mapping a piece of type information with primary color screens 50 and a spot color screen 52. The primary color screens 50 include the CMYK color screens (the color screens 50C, 50M, 50Y, and 50K) in the same manner as in the embodiment. The type information, the primary color screens 50, and the spot color screen 52 are the same as those according to the embodiments and the modifications described above.

For example, in the example illustrated in FIG. 19, type information "200 Dot", color screens 50C1, 50M1, 50Y1, and 50K1 that are the primary color screens 50, and a spot color screen 52A that is the spot color screen 52 are registered in the first information 28 in a manner mapped to one another.

In the same manner, type information "175 Dot", color screens 50C2, 50M2, 50Y2, and 50K2 that are the primary color screens 50, and a spot color screen 52B that is the spot color screen 52 are registered in first information 28 in a manner mapped to one another. In the same manner, type information "150 Dot", color screens 50C3, 50M3, 50Y3, and 50K3 that are the primary color screens 50, and a spot color screen 52C that is the spot color screen 52 are registered in the first information 28 in a manner mapped to one another. In the same manner, type information "360 Dot", color screens 50C4, 50M4, 50Y4, and 50K4 that are the primary color screens 50, and a spot color screen 52D that is the spot color screen 52 are registered in the first information 28 in a manner mapped to one another.

In other words, in this modification, a primary color screen 50, and a spot color screen 52 with a second phase that is different from the first phase, which is defined by the cyclic arrangement of lines in the primary color screen 50, are stored in a manner mapped to each piece of type information in the storage unit 242 in advance.

Referring back to FIG. 18, the explanation is continued. The image processor 20B includes the acquirer 11, the color conversion processor 12, the gamma converter 13, the amount regulator 14, the halftone generator 15, the receiver 16, the input information determiner 17, and a screen setter 180. The image processor 20B has the same configuration as the image processor 20 according to the first embodiment, except for having the screen setter 180, instead of the screen setter 18, and not having the screen generator 19.

In other words, in this modification, because the storage unit 242 stores therein the first information 28 in which the primary color screens 50 and the spot color screens 52 are registered, the image processor 20B is not provided with the screen generator 19.

The screen setter 180 reads the primary color screen 50 and the spot color screen 52 that are mapped to the type information received by the receiver 16 from the first information 28 stored in the storage unit 242. The screen setter 18 then outputs the read screens 54 (the primary color screens 50 (the color screens 50C, 50M, 50Y, and 50K) and the spot color screen 52) to the halftone generator 15.

A sequence of the image processing executed by the image processing apparatus 10B according to the modification will now be explained.

FIG. 20 is a flowchart illustrating an example of the sequence of image processing executed by the image processing apparatus 10B according to the modification. Explained below is an example assuming that the acquirer 11 has already acquired the image data 34, and the image data (the primary color image data 30, the spot color image data 32) processed by the gamma converter 13 and the amount regulator 14 has already been output to the halftone generator 15.

To begin with, the receiver 16 receives a designation of type information (Step S300). The process at Step S300 is the same as the process of receiving a designation of type information in the first embodiment (see Step S100 at FIG. 11).

The screen setter 180 then reads the primary color screen 50 mapped to the type information received at Step S300 from the first information 28 in the storage unit 242 (Step S302).

The screen setter 180 then reads the spot color screen 52 mapped to the type information received at Step S300 from the first information 28 in the storage unit 242 (Step S304).

The screen setter 180 then outputs the primary color screens 50 and the spot color screen 52 respectively read at Step S302 and Step S304 to the halftone generator 15. Through this process, the screen setter 180 sets the screens 54 (the primary color screens 50, the spot color screen 52) to be used in the halftoning to the halftone generator 15 (Step S306).

The halftone generator 15 then performs the screen process (halftoning) to each piece of the primary color image data 30 and the spot color image data 32 using the screens 54 set at Step S306 (Step S308). The process at Step S308 is the same as Step S112 in the first embodiment (see FIG. 11). The routine is then ended.

As explained above, in this modification, the image processing apparatus 10B reads the primary color screens 50 and the spot color screen 52 stored in advance, before performing the halftoning. In this manner, even when the primary color screens 50 and the spot color screen 52 are stored in advance, the spot color effect of the spot color material can be achieved, in the same manner as in the embodiments and the modifications described above, without deteriorating the color achieved by the primary color materials.

The process executed by the image processing apparatus 10, 10A, 10B according to the embodiments and the modification is provided as a computer program product, in a manner recorded in a computer-readable storage medium such as a compact disc read-only memory (CD-ROM), a flexible disk (FD), a compact disc recordable (CD-R), and a digital versatile disc (DVD), as a file in an installable or executable format.

The computer program executed by the image processing apparatus 10, 10A, 10B according to the embodiments and the modifications may be stored in a computer connected to a network such as the Internet, and made available for download. Furthermore, the computer program executed by the image processing apparatus 10, 10A, 10B according to the embodiments and the modifications may be provided or distributed over a network such as the Internet.

Furthermore, the computer program executed by the image processing apparatus 10, 10A, 10B according to the embodiments and the modifications may be provided in a manner incorporated in a ROM or the like in advance.

According to an embodiment, the spot color effect of a spot color material can be achieved, without deteriorating the colors achieved by primary color materials, advantageously.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing apparatus, comprising:
processing circuitry configured to
acquire image data including primary color image data for primary color and spot color image data for spot color;
generate, from the acquired primary color image data, primary color halftone data representing the primary color image data as a group of halftone dots, using a primary color screen specifying a cyclic arrangement of lines of halftone dots;
generate, from the acquired spot color image data, spot color halftone data representing the spot color image data as a group of halftone dots, using a spot color screen having a spot screen frequency, a spot screen angle, and a second phase that is generated by shifting a first phase represented by the cyclic arrangement of lines specified in the primary color screen to the second phase; and
output print data including the generated primary color halftone data and the generated spot color halftone data.

2. The image processing apparatus according to claim 1, wherein
the primary color image data includes a plurality of pieces of color image data for respective different colors,
the primary color screen includes color screens corresponding to the respective different colors, and each having a screen angle and a screen frequency that are different from those of other color screens, and
the processing circuitry is further configured to generate the spot color halftone data using the spot color screen resulting from the shifting of the first phase, which is specified in one of the color screens corresponding to the respective different colors, to the second phase.

3. The image processing apparatus according to claim 2, wherein the processing circuitry is further configured to generate the spot color halftone data using the spot color screen resulting from the shifting of the first phase, which is specified in the color screen corresponding to a black color or one of the different colors that interferes less with other colors, to the second phase.

4. The image processing apparatus according to claim 1, further comprising a memory to store first information that maps type information indicating a halftoning type, and a screen frequency and a screen angle corresponding to each piece of primary color information representing the primary color and spot color information representing the spot color,
- wherein the processing circuitry is further configured to receive a designation of the type information; and
- generate the spot color screen by shifting a phase of a screen having a screen frequency and a screen angle mapped to the received type information and the spot color information, from the first phase of the primary color screen exhibiting the screen frequency and the screen angle mapped to the received type information and the primary color information, to the second phase.

5. The image processing apparatus according to claim 2, wherein the processing circuitry is further configured to:
- receive setting information including screen frequencies and screen angles corresponding to pieces of color information representing the respective different colors included in the primary color;
- generate the color screens, for the respective different colors, using the screen frequencies and the screen angles included in the received setting information; and
- generate the spot color screen by the shifting of the first phase, which is specified in one of the color screens corresponding to the respective different colors, to the second phase.

6. The image processing apparatus according to claim 2, wherein the processing circuitry is further configured to:
- receive setting information including screen frequencies and screen angles corresponding to respective pieces of color information representing the respective different colors included in the primary color, and the spot screen frequency and the spot screen angle corresponding to the spot color information representing the spot color;
- generate, for each of the different colors, the color screen having a screen frequency and a screen angle corresponding to the piece of color information and included in the received setting information;
- generate the spot color screen having the spot screen frequency and the spot screen angle corresponding to the spot color information and included in the received setting information, and resulting from the shifting of the first phase, which specified in one of the color screens corresponding to the respective different colors, to the second phase;
- receive phase shift information indicating an amount of phase shift between the first phase and the second phase; and
- generate the spot color screen at the second phase resulting from shifting the first phase by the amount of phase shift indicated by the phase shift information.

7. An image processing method, comprising:
- acquiring image data including primary color image data for primary color and spot color image data for spot color;
- generating, from the acquired primary color image data, primary color halftone data representing the primary color image data with a group of halftone dots, using a primary color screen specifying a cyclic arrangement of lines of halftone dots;
- generating, from the acquired spot color image data, spot color halftone data representing the spot color image data with a group of halftone dots, using a spot color screen having a spot screen frequency, a spot screen angle, and a second phase that is generated by shifting a first phase represented by the cyclic arrangement of lines specified in the primary color screen to the second phase; and
- outputting print data including the generated primary color halftone data and the generated spot color halftone data.

8. A non-transitory computer-readable recording medium with an executable program stored thereon, wherein the program instructs a computer to perform:
- acquiring image data including primary color image data for primary color and spot color image data for spot color;
- generating, from the acquired primary color image data, primary color halftone data representing the primary color image data with a group of halftone dots, using a primary color screen representing a cyclic arrangement of lines of halftone dots;
- generating, from the acquired spot color image data, spot color halftone data representing the spot color image data with a group of halftone dots, using a spot color screen having a spot screen frequency, a spot screen angle, and a second phase that is generated by shifting a first phase represented by the cyclic arrangement of lines represented in the primary color screen to the second phase; and
- outputting print data including the generated primary color halftone data and the generated spot color halftone data.

9. The image processing apparatus of claim 1, wherein the processing circuitry is further configured to output the print data to a print engine, which forms an image on a recording medium using the primary color halftone data and the spot color halftone data.

\* \* \* \* \*